United States Patent
Sasidharan et al.

(10) Patent No.: US 10,880,279 B2
(45) Date of Patent: Dec. 29, 2020

(54) VIRTUAL BROADCAST OF UNICAST DATA STREAM IN SECURED WIRELESS LOCAL AREA NETWORK

(71) Applicant: SONY CORPORATION, Tokyo (JP)

(72) Inventors: Anil Sasidharan, Bangalore (IN); Shinaj Pandikasalakkal, Bangalore (IN); Jaison Joseph, Bangalore (IN)

(73) Assignee: SONY CORPORATION, Tokyo (JP)

(*) Notice: Subject to any disclaimer, the term of this patent is extended or adjusted under 35 U.S.C. 154(b) by 218 days.

(21) Appl. No.: 16/178,737

(22) Filed: Nov. 2, 2018

(65) Prior Publication Data

US 2020/0145391 A1    May 7, 2020

(51) Int. Cl.
| | |
|---|---|
| H04L 29/06 | (2006.01) |
| H04L 9/08 | (2006.01) |
| H04L 9/14 | (2006.01) |
| H04W 12/04 | (2009.01) |
| H04W 12/06 | (2009.01) |
| H04W 84/12 | (2009.01) |
| H04W 88/08 | (2009.01) |

(52) U.S. Cl.
CPC .......... *H04L 63/0457* (2013.01); *H04L 9/085* (2013.01); *H04L 9/0819* (2013.01);
(Continued)

(58) Field of Classification Search
CPC ......... H04L 9/0819–0836; H04L 9/085; H04L 9/14–16; H04L 12/18–1895;
(Continued)

(56) References Cited

U.S. PATENT DOCUMENTS

| | | | |
|---|---|---|---|
| 8,831,227 B2 | 9/2014 | Ge et al. | |
| 2002/0191764 A1* | 12/2002 | Hori | G06F 21/10 |
| | | | 379/200 |

(Continued)

FOREIGN PATENT DOCUMENTS

| | | |
|---|---|---|
| CN | 105284073 A | 1/2016 |
| EP | 2981020 A1 | 2/2016 |

(Continued)

OTHER PUBLICATIONS

International Search Report and Written Opinion of PCT Application No. PCT/IB2019/058625, dated Dec. 16, 2019, 13 pages of ISRWO.

*Primary Examiner* — Kevin Bechtel
(74) *Attorney, Agent, or Firm* — Chip Law Group

(57) ABSTRACT

A communication system that includes a data streaming station, a wireless access point (WAP), a first communication station, and a second communication station is provided. The data streaming station, WAP, the first communication station, and the second communication station operate in a first radio frequency (RF) channel of a wireless local area network (WLAN). The first communication station and the data streaming station receive a mirroring request from the second communication station, via the WAP, and authenticate the second communication station as a valid station. The first communication station and the data streaming station share a temporal key with the second communication station, based on authentication of the second communication station. The second communication station captures data packets of the encrypted data stream, via the WAP, based on RF monitoring of network traffic and decrypts the captured data packets based on the temporal key.

25 Claims, 15 Drawing Sheets

(52) U.S. Cl.
CPC .............. *H04L 9/14* (2013.01); *H04W 12/04* (2013.01); *H04W 12/06* (2013.01); *H04W 84/12* (2013.01); *H04W 88/08* (2013.01)

(58) Field of Classification Search
CPC ... H04L 45/16; H04L 49/201; H04L 63/0428; H04L 63/0457; H04L 63/08; H04L 65/4076; H04W 4/06; H04W 12/0013; H04W 12/00305; H04W 12/04–04071; H04W 12/06–0609; H04W 76/40; H04W 84/12; H04W 88/08–10
See application file for complete search history.

(56) References Cited

U.S. PATENT DOCUMENTS

| | | | |
|---|---|---|---|
| 2006/0200678 A1* | 9/2006 | Yamada | H04L 63/062 713/182 |
| 2008/0219452 A1 | 9/2008 | Lu et al. | |
| 2014/0351477 A1 | 11/2014 | Lee et al. | |
| 2015/0372996 A1 | 12/2015 | Schrum, Jr. et al. | |
| 2016/0173280 A1* | 6/2016 | Tribble | H04L 63/0435 713/153 |
| 2016/0285839 A1 | 9/2016 | Kunihiro et al. | |
| 2018/0007013 A1 | 1/2018 | Wang | |
| 2018/0288010 A1 | 10/2018 | Chowdhury et al. | |
| 2019/0028442 A1* | 1/2019 | Pillai | H04L 9/0841 |

FOREIGN PATENT DOCUMENTS

| | | |
|---|---|---|
| EP | 3382985 A1 | 10/2018 |
| JP | 6107935 B2 | 4/2017 |
| JP | 2017-524288 A | 8/2017 |
| KR | 10-2017-0004418 A | 1/2017 |
| KR | 10-2017-0020358 A | 2/2017 |
| WO | 2014/155844 A1 | 10/2014 |
| WO | 2015/196132 A2 | 12/2015 |
| WO | 2018/004888 A1 | 1/2018 |

* cited by examiner

VIRTUAL BROADCAST OF UNICAST DATA STREAM IN SECURED WIRELESS LOCAL AREA NETWORK

CROSS-REFERENCE TO RELATED APPLICATIONS/INCORPORATION BY REFERENCE

None.

FIELD

Various embodiments of the disclosure relate to wireless networking technologies associated with a secured unicast data access for multiple devices based on a custom wireless communication protocol. More specifically, various embodiments of the disclosure relate to a system that handles a virtual broadcast of unicast data stream in a secured wireless local area network.

BACKGROUND

Recent advancements in wireless technologies have paved the way for wider adoption of wireless local area network (WLAN) as a preferred network among different types of networks, such as wired Ethernet networks. Wireless access points (e.g. access points as routers) in a wireless local area network can provide suitable data rates for data (e.g., a 4K High-Definition (HD) video) that is unicasted to a receiving node (e.g., a smartphone). However, when the same access points are configured to broadcast the same data to multiple nodes, the data rate decreases to a base data rate (i.e. a lowest data rate) supported on the wireless local area network. This may be a concern as data that requires a high bandwidth (or data rate) for transmission also requires that a receiving node can suitably receive and present the data, without an adverse effect on quality or integrity of data. For example, a 4K HD video may require a minimum data rate of 20 Mbps, below which the playback of the 4K HD video may be affected by the lower data rate. Also, the data may be conventionally broadcasted in an open wireless network that makes the wireless network an insecure network. The insecure network may be more prone to cyber intruders for data theft or misuse of the data transmitted in the wireless network. A lack of adequate security in wireless networks may lead to criminal attacks such as theft of data, corruption of system integrity, hacking, and the like.

Further limitations and disadvantages of conventional and traditional approaches will become apparent to one skilled in the art, through comparison of described systems with some aspects of the present disclosure, as set forth in the remainder of the present application and with reference to the drawings.

SUMMARY

A system and method are provided for a virtual broadcast of unicast data stream in secured wireless local area network, as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Certain embodiments of the disclosure may be found in a system and a method for a virtual broadcast of unicast data stream in a secured wireless local area network (WLAN). Various embodiments of the disclosure may provide a system. The system may include a wireless access point, a first communication station that includes a first network circuitry, and a second communication station that includes a second network circuitry. The wireless access point, the first communication station, and the second communication station may operate in a first radio frequency (RF) channel and in a wireless local area network (WLAN). The disclosed communication system includes wireless access points (e.g. access points as routers) in the wireless local area network that can provide suitable data rates for data streams (e.g., a Full High-Definition (FHD) video) that is unicasted to a receiving node (e.g., a smartphone).

Currently, in a case where a same access point is configured to broadcast a same data stream to multiple nodes, the data rate decreases to a base data rate (i.e. a lowest data rate) supported on the wireless local area network. In contrast, the disclosed communication system utilizes a key exchange protocol that securely enables other nodes in the communication system (i.e., other nodes that are not receiving nodes for the unicasted data stream) to operate in a monitoring mode. The other nodes monitor network traffic in a dedicated RF channel and selectively decrypt data packets that are part of the unicast data stream for a unicast node based on a temporal key exchanged securely, via the implementation of the key exchange protocol. Thus, the disclosed system handles a virtual broadcast of unicast data stream to other nodes in the secured wireless local area network, without a reduction in the data rates that the wireless access point is capable to provide while unicasting the data stream to the receiving node.

Figure 1A:
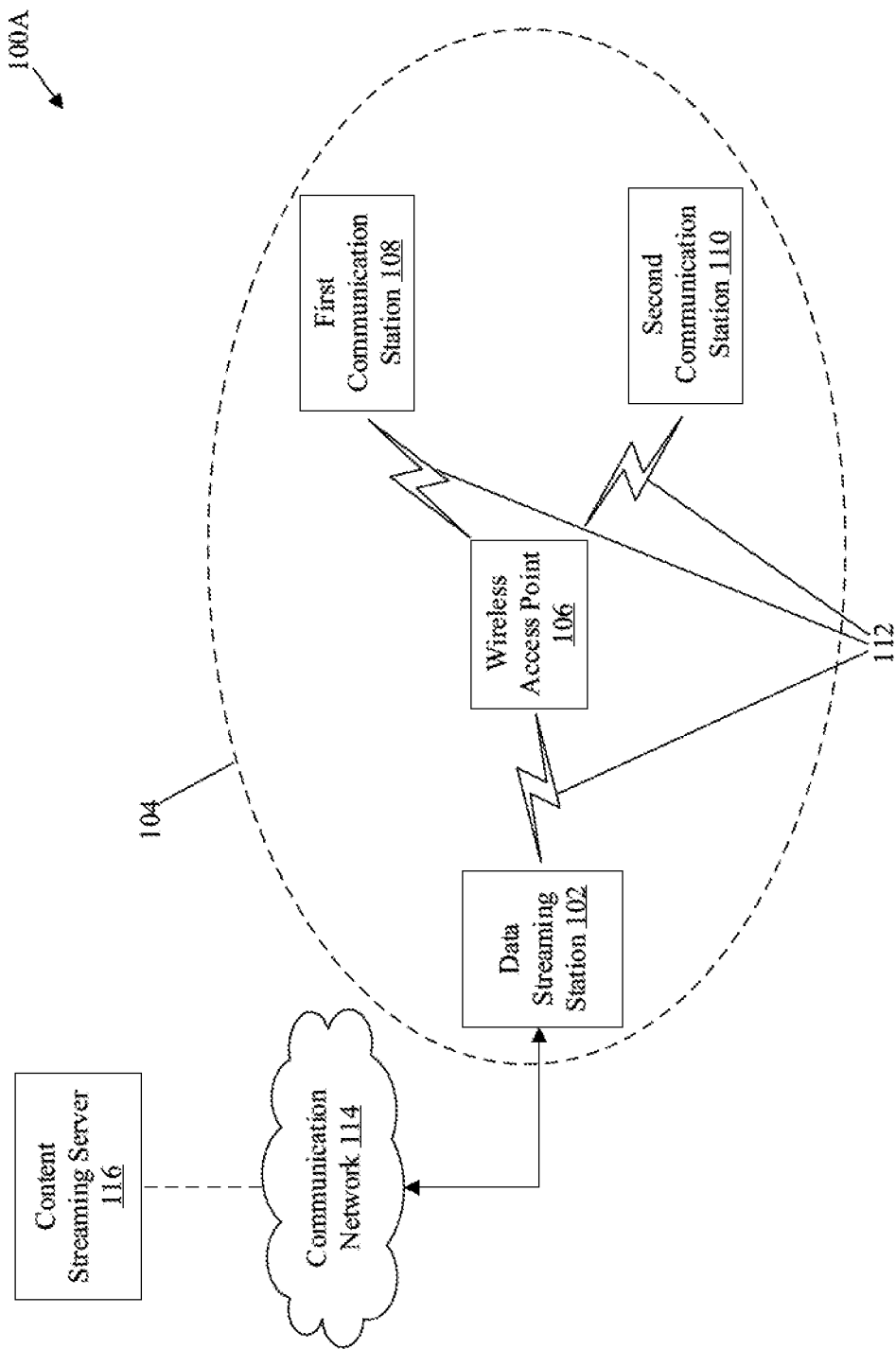
FIG. 1A illustrates a network environment for a virtual broadcast of unicast data stream in a secured wireless local area network (WLAN), in accordance with an embodiment of the disclosure.

FIG. 1A illustrates a network environment for a virtual broadcast of unicast data stream in a secured wireless local area network, in accordance with an embodiment of the disclosure. With reference to FIG. 1, there is shown a network environment 100A that may include a communication system 104. The communication system 104 may include a data streaming station 102, a wireless access point 106, a first communication station 108, and a second communication station 110. There is further shown a wireless local area network (WLAN) 112 that is established among the data streaming station 102, the wireless access point 106, the first communication station 108, and the second communication station 110. In some embodiments, the data streaming station 102 of the communication system 104 may be communicatively coupled to a content streaming server 116, via a communication network 114. The data streaming station 102, the first communication station 108, and the second communication station 110 may communicate wirelessly via the wireless access point 106. In some embodiments, the wireless access point 106 of the communication system 104 may be directly coupled to the data streaming station 102, without any intermediary data communication equipment, such as routers, network bridges, and network switches.

The data streaming station 102 may comprise suitable logic, circuitry, and interfaces that may be configured to transmit a data stream (or multiple data streams) to different communication stations (e.g., the first communication station 108 or the second communication station 110), via one or more wireless access points (e.g., the wireless access point 106). The data streaming station 102 may transmit data stream as a unicast stream to the first communication station 108, via the wireless access point 106. In accordance with an embodiment, the data stream may be transmitted over a single hop network, where the wireless access point 106 is the only node through which packets of the data stream hop to reach target devices (such as the first communication station 108). In accordance with another embodiment, the data stream may be transmitted over a multi-hop network, where packets of the data stream pass through different networks, network switches, network bridges, or access points to reach target devices (such as the first communication station 108).

In accordance with an embodiment, the data streaming station 102 may be a portable or a non-portable electronic device that may act as an originating physical node for transmission of the data stream to different receiver nodes (i.e., data terminal equipment, such as smartphones, PCs, etc.), through a data communication equipment (e.g., a Wi-Fi router). In such implementation, examples of the data streaming station 102 may include, but are not limited to, smartphones, tablets, laptops, augmented reality/virtual reality/mixed reality (AR/VR/MR) devices, or video cameras that stream video feed and live data feed. In accordance with another embodiment, the data streaming station 102 may be a server (e.g., a cloud server) that may be part of a distributed system of network devices, where the data streaming station 102 may transmit the data stream through different intermediary nodes (i.e. nodes that act as a data link between an originating node and a destination node). In such an implementation, examples of the data streaming station 102 may include, but are not limited to, cloud servers, media servers (i.e. as part of a content delivery network), ad hoc servers on local communication devices (e.g., smartphones), and a virtual server on a remote or a local device connected directly (or through the communication network 114) to different wireless access points (e.g., the wireless access point 106).

The communication system 104 may include a plurality of communication stations that are registered on the WLAN 112 to access data stream from a streaming station, such as the data streaming station 102. The plurality of communication stations may include unicast stations and radio frequency (RF) monitoring (MON) stations (also referred to as unicast nodes and RFMON nodes). More specifically, there may be a first set of stations (i.e. a first set of physical nodes or devices) that receives unicast data streams on specific RF channels (e.g., a 24 MHz non-overlapping channel in a 2.4 GHz sub-band of the WLAN 112) and a second set of stations that operate in a RFMON mode, in which such stations sniff encrypted data packets on the specific RF channels allocated to the first set of stations. In certain embodiments where the transmission of the data stream occurs over a single hop network, the data streaming station 102 is a part of the communication system 104. In other embodiments where the transmission of the data stream occurs over a multi-hop network, the data streaming station 102 may be associated externally with different communication systems, with each one having a dedicated wireless access point and a set of unicast and RFMON stations.

The wireless access point 106 may comprise suitable logic, circuitry, and interfaces that may be configured to create and/or manage a WLAN, such as the WLAN 112, through which different communication stations (e.g. as shown in FIG. 1A, the first communication station 108 or the second communication station 110) may access a data stream from the data streaming station 102. The wireless access point 106 may host connection and control the access to the WLAN 112 for different communication stations, such as the data streaming station 102, the first communication station 108, and the second communication station 110. The wireless access point 106 may be part of the data link layer (DLL) of a data communication equipment (e.g., a Wi-Fi router) that is part of the physical layer (PL) of the WLAN 112. The wireless access point 106 (as part of a data communication equipment (DCE)) may be configured to transmit and receive the data stream and other communication information over radio frequencies (RF) for wireless enabled devices (such as, the first communication station 108 and the second communication station 110). The wireless access point 106 may be further configured to facilitate connectivity between devices (such as, the first communication station 108 and the second communication station 110). As an example, data packets (as per 802.03 standard) from Ethernet may be received and transmitted by the wireless access point 106 as wireless data packets (as per 802.11 standard or other standards/associated variants to different devices connected in the WLAN 112.

In some embodiments, the wireless access point 106 may be configured to establish a hotspot network (in a wireless ad hoc network (WANET)) for the first communication station 108 and the second communication station 110 the WLAN 112. In such configuration, the wireless access point 106 may be a software access point or a part of a wireless network interface of one or more communication stations (e.g., a mobile device) in the communication system 104. In such configuration, different communication stations (such as the first communication station 108, the second communication station 110, and the data streaming station 102 may be communicate with each other as per a specific network topology.

The first communication station 108 may comprise suitable logic, circuitry, and interfaces that may be configured to request and receive a data stream (e.g., a video stream or an audio stream) through a network, such as, the WLAN 112, managed by the wireless access point 106. In some cases, the first communication station 108 may be configured to request and receive services from the data streaming station 102. The first communication station 108 may be a user-end equipment that may be equipped with a wireless network interface controller (WNIC) to establish a connection with the WLAN 112 and manage reception and transmission of data packets (of a data stream) through the WLAN 112. In an exemplary embodiment, the first communication station 108 may be a unicast node (physical node/device) that may request and receive unicast data streams from a data streaming node (e.g., the data streaming station 102). For every data packet that is received by the first communication station 108, an acknowledgement for the reception of the packet is transmitted to the wireless access point 106. Examples of the first communication station 108 may include, but are not limited to, a computing device, a mobile device, a camera, a laptop, an IP phone, a smartphone, or a non-portable device, such as a desktop computer, a server, or a workstation that is equipped with a wireless network interface.

The second communication station 110 may comprise suitable logic, circuitry, and interfaces that may be configured to monitor the network traffic (data packets or frames) in a monitoring mode (or RFMON mode) on different or specific RF channels of the WLAN 112. In the monitoring mode, the second communication station 110 may be configured to accept every data packet in the first RF channel, irrespective of whether the (Media Access Control) MAC address in the packet header matches the MAC address of the second communication station 110. For every packet that the second communication station 110 receives, no acknowledgement may be sent to the wireless access point 106. The second communication station 110 may be further configured to capture data packets of the encrypted data stream from the data streaming station 102, via the wireless access point 106, based on an authentication from the first communication station 108. The second communication station 110 may operate in the same RF frequency and same RF channel as the first communication station 108 in the WLAN 112. Examples of the second communication station 110 may include, but are not limited to, a computing device, a mobile device, a camera, a laptop, an IP phone, a smartphone, or a non-portable device, such as a desktop computer, a server, or a workstation that is equipped with a wireless network interface.

The WLAN 112 may include a medium through which two or more stations (physical nodes), such as the first communication station 108 and the second communication station 110, may communicate data with each other or from stations (i.e. nodes) that operate in a different network (e.g., Internet). The WLAN 112 may be based on Institute of Electricals and Electronics Engineers (IEEE) standards operational in infrastructure mode (Basic Service Set (BSS) configurations), or in some specific cases, in ad hoc mode (Independent Basic Service Set (IBSS) configurations). The WLAN 112 may be operational in accordance with IEEE 802 wireless standards or a modified protocol, which may include, but are not limited to, 802.3, 802.15.1, 802.16 (Wireless local loop), 802.20 (Mobile Broadband Wireless Access (MBWA)), 802.11-1997 (legacy version), 802.11a, 802.11b, 802.11g, 802.11e, 802.11i, 802.11F, 802.11c, 802.11h (specific to European regulations) 802.11n, 802.11j (specific to Japanese regulations), 802.11ac, 802.11ad, 802.11ah, 802.11aj, 802.11ax, 802.11 ay, 802.11az, 802.11hr (high data rate), 802.11af (white space spectrum), 802.11-2007, 802.11-2008, 802.11-2012, 802.11-2016. The first RF channel, RF frequency sub-band, modulation techniques, and other parameters may be different for some 802 standards in use by the WLAN 112 and may not affect the data communication, without a departure from scope of the disclosure.

The communication network 114 may include a medium through which the data streaming station 102, and the communication system 104 may communicate with each other. The communication network 114 may be a wired or wireless communication network. Examples of the communication network 114 may include, but are not limited to, a Local Area Network (LAN), a Wireless Local Area Network (WLAN), a cloud network, a Long Term Evolution (LTE) network, a plain old telephone service (POTS), a Metropolitan Area Network (MAN), and/or the Internet. Various devices in the network environment 100 may be configured to connect to the communication network 114, in accordance with various wired and wireless communication protocols. Examples of such wired and wireless communication protocols may include, but are not limited to, Transmission Control Protocol and Internet Protocol (TCP/IP), User Datagram Protocol (UDP), Hypertext Transfer Protocol (HTTP), File Transfer Protocol (FTP), ZigBee, EDGE, infrared (IR), IEEE 802.11, 802.16, cellular communication protocols, and/or Bluetooth (BT) communication protocols.

The content streaming server 116 may comprise suitable logic, circuitry, and interfaces that may be configured to transmit data stream and other communication data through different intermediary nodes to different destination nodes (e.g., the first communication station 108 and the second communication station 110) in the WLAN 112. The content streaming server 116 may be a server (e.g., a cloud server) or a server cluster that may be part of a distributed system of network devices. Examples of the content streaming server 116 may include, but are not limited to, cloud servers, media servers (i.e. as part of a content delivery network), ad hoc servers on local communication devices (e.g., smartphones), and a virtual server on a remote or a local device connected through the communication network 114 to different wireless access points (such as the wireless access point 106).

In operation, the first communication station 108 may be configured to receive a data stream from the data streaming station 102 in a unicast mode, on request of a user associated with the first communication station 108. The data stream transmitted from the data streaming station 102, via the wireless access point 106, as a unicast stream to the first communication station 108, may be encrypted before transmission. In some embodiments, the data stream may be transmitted first to the first communication station 108 via the communication network 114 and through the wireless access point 106. The encryption of the data stream transmitted from the data streaming station 102 may secure a connection between the data streaming station 102 and the first communication station 108 of the communication system 104. In some embodiments, the data stream may be transmitted from the data streaming station 102 to the first communication station 108, via the wireless access point 106 without the encryption of the data stream.

In accordance with an embodiment, the data streaming station 102 may be configured to transmit a live stream (as a unicast stream) of data/content to the first communication station 108. In accordance with an embodiment, the data streaming station 102 may be configured to store data that may be transmitted to the first communication station 108 based on a user's request. The data streaming station 102 may store data, such as pre-recorded data, or live data stream, content from other data streaming stations or servers.

The wireless access point 106 may be configured to support a higher data rate (e.g., from 40 to 80 Megabits per second (Mbps)) with a higher throughput for transmission of the data packets of the data stream to the first communication station 108. In accordance with an embodiment, the data streaming station 102 may be configured to transmit the data stream to the first communication station 108 in a single hop wireless network in form of data packets. In the single hop wireless network, a single hop may be required by the data packets to leave the originating node (i.e. the data streaming station 102) before reaching a destination node (i.e. the first communication station 108). In the single hop wireless network, the data packets from the data streaming station 102 may pass through the wireless access point 106 to reach the first communication station 108. In certain embodiments, the data stream corresponds to a high resolution video from the data streaming station 102 that is streamed to the first communication station 108 at a unicast data rate (e.g., near "54 Mbps" or higher), supported by the WLAN 112. The first communication station 108 may send an acknowledgement signal to the data streaming station 102 based on a receipt of the data packets in the unicast mode.

Conventionally, for other communication stations (such as the second communication station 110) to receive the same data stream that is unicasted to the first communication station 108, the data streaming station 102 may have to operate in a broadcast mode or a multicast mode. In broadcast mode, the data stream from the data streaming station 102 may be broadcasted to a plurality of stations, such as the first communication station 108 and the second communication station 110, at the same time. Consequently, unlike the rate with which the data stream was transmitted from the data streaming station 102 to the first communication station 108 at the unicast data rate, the data rate for broadcast of the data stream decreases to a base rate in the WLAN 112. As an example, the wireless access point 106 may transmit a high definition video stream at a unicast data rate of "54 Mbps" to the first communication station 108. However, in the broadcast mode, the same data stream may be broadcasted to the first communication station 108 and the second communication station 110 at the base rate of "2 Mbps". The base rate of broadcasted data stream may be insufficient for either of the first communication station 108 and the second communication station 110 to receive and present data stream at the first communication station 108 and the second communication station 110. When the data stream is broadcasted and/or multi-casted, the maximum data rate that is supported by the WLAN 112 decreases to the base data rate, i.e., the lowest data rate supported by the wireless access point 106. The data rate of "2 Mbps" is a much lower rate of transmission as compared to actual bandwidth (in terms of data rate) available for the WLAN 112.

In order for other stations (such as the second communication station 110) to receive the same data stream that is unicasted to the first communication station 108, the data streaming station 102 may be configured to operate in the unicast mode. In the unicast mode, the data streaming station 102 may be configured to transmit the data stream to the first communication station 108 and other stations in the WLAN 112 (such as the second communication station 110), via the wireless access point 106. Other communication stations, such as the second communication station 110, may be configured to operate in the monitoring mode (or the RFMON mode). More specifically, other stations (such as the second communication station 110) in the WLAN 112 that need access to the data stream at the unicast data rate (e.g. at "54 Mbps") through the wireless access point 106, may be configured to switch to the same RF channel that is currently accessed by the first communication station 108.

The other stations (such as the second communication station 110) in the WLAN 112 may be configured to sniff the data packets in the same RF channel and get access to the security key (i.e. the temporal key) to decrypt and reconstruct the data packets in the data stream that was unicasted to the first communication station 108. Therefore, other stations in the WLAN 112 may be configured to receive the same data stream simultaneously as the first communication station 108 receives the data stream. However, the configuration of the WLAN 112 may still remain to be in a unicast mode at the same unicast data rate (e.g., "54 Mbps" or higher). The configuration of the WLAN 112 in which different communication stations (in monitoring mode/RFMON mode) and a communication station (as a unicast node) receive the same data stream may be referred to as a virtual broadcast of unicast data stream. The data stream may be encrypted and the access to the data stream for other communication stations may be managed in the secured WLAN 112.

The wireless access point 106 may be configured to utilize the bandwidth (in terms of data rates) available in the WLAN 112 to virtually broadcast the unicast data stream meant for the first communication station 108 to a plurality of stations, such as the second communication station 110. The second communication station 110 of the communication system 104 may utilize an RF monitoring (RFM) technique to monitor network traffic in the first RF channel. More specifically, in RF monitoring (RFM) technique, the second communication station 110 may be configured to accept all the data packets in the first RF channel, without filtering data packets that have a different device address in the header of the data packets.

In some embodiments, the data streaming station 102 and the wireless access point 106 may have an agreement as per a security protocol for transmission of the data packets of the data stream from the data streaming station 102 to the wireless access point 106. The data stream may be encrypted before transmission based on the agreement between the data streaming station 102 and the wireless access point 106. Upon receipt of the data stream (encrypted), the wireless access point 106 may be configured to decrypt the data packets of the data stream and apply a wireless encryption scheme (such as a temporal key based encryption scheme) on the data packets of the data stream for transmission of encrypted data packets to the first communication station 108 in the WLAN 112. The data streaming station 102 may be configured to transmit a plurality of encrypted data packets of the data stream to the first communication station 108, via the wireless access point 106. In accordance with an embodiment, a first type of encryption key on the plurality of encrypted data packets from the data streaming station 102 to the wireless access point 106 may be different from a second type of encryption key on the encrypted data stream transmitted via the wireless access point 106 to the first communication station 108. Also, the wireless access point 106 may be further configured to transmit a temporal key (e.g. a master temporal key to generate a pairwise transient key) to the first communication station 108.

The first communication station 108 may be configured to decrypt the data packets of the data stream based on the temporal key received from the wireless access point 106. Upon receipt of the data stream, the first communication station 108 may be configured to transmit a first acknowledgement signal to the data streaming station 102, via the wireless access point 106. The transmission of the first acknowledgement signal from the first communication station 108 to the data streaming station 102 may be based on receipt of the encrypted data stream at the first communication station 108, via the wireless access point 106. The data streaming station 102 may retransmit the data packet or transmit the next data packet, based on the first acknowledgement signal received at the data streaming station 102. The transmission of the data stream from the data streaming station 102 to the first communication station 108, via the wireless access point 106 in a unicast mode facilitates the communication system 104 to utilize a maximum bandwidth (in terms of data rate) that is available to the WLAN 112.

Initially, when the data stream is encrypted, only the data streaming station 102, the wireless access point 106, and the first communication station 108 may have a capability to decrypt the data packets of the data stream. Alternatively stated, initially, without an access to the temporal key, the second communication station 110 in the WLAN 112 may be configured to only monitor and accept the encrypted data packets of the data stream. The second communication station 110 may lack the authentication and access to the temporal key by which the data packets may be decrypted. Therefore, in accordance with an embodiment, the first communication station 108 may be configured to receive a mirroring request from the second communication station 110, via the wireless access point 106. In accordance with another embodiment, the mirroring request from the second communication station 110 may be received by the data streaming station 102. The request may be a user's request from the second communication station 110. The first communication station 108 may correspond to a mirrored station that acts as a destination node that is connected to a source node (i.e. the data streaming station 102), through a hub (i.e. the wireless access point 106). The second communication station 110 may correspond to the mirroring station that may mirror the first communication station 108 in the same radio frequency channel of the first communication station 108. The same radio frequency channel for all the stations or components in the WLAN 112 may be required for the communication system 104 to achieve the virtual broadcast of the unicast data stream in the secured WLAN 112.

In accordance with an embodiment, the mirroring request from the second communication station 110 to the first communication station 108 may correspond to a request for decryption of an encrypted data stream that is unicasted only to the first communication station 108 at the unicast data rate, via the wireless access point 106. The mirroring request may be based on a key exchange protocol between the first communication station 108 and the second communication station 110. The mirroring request from the second communication station 110 may be transmitted over a data packet, encrypted by a security key (e.g., a pre-shared key), to the first communication station 108. In order to decrypt the data packets sniffed in the RFMON mode, the second communication station (of the plurality of stations) may be configured to request the first communication station 108 to authenticate and transmit the temporal key (e.g., a pairwise transient key). The temporal key may be required to mirror the unicast communication between the wireless access point 106 and the first communication station 108.

In accordance with another embodiment, the mirroring request from the second communication station 110 to the data streaming station 102 may correspond to a request for decryption of an encrypted data stream that is unicasted from the data streaming station 102 at the unicast data rate to the wireless access point 106. The mirroring request may be based on a key exchange protocol between the data streaming station 102 and the second communication station 110. The mirroring request from the second communication station 110 may be transmitted over a data packet, encrypted by a security key (e.g., a pre-shared key), to the data streaming station 102. In order to decrypt the data packets sniffed in the RFMON mode, the second communication station 110 (of the plurality of stations) may be configured to request the data streaming station 102 to authenticate and transmit the temporal key (e.g., a pairwise transient key). The temporal key may be required to mirror the unicast communication between the data streaming station 102 and the wireless access point 106.

In accordance with an embodiment, the first communication station 108 may be configured to authenticate the second communication station 110 as a valid station based on a response received from the second communication station 110. The second communication station 110 may be authenticated based on a validation of the response that is encrypted by a security key preset on the first communication station 108 and the second communication station 110. The key exchange protocol between the first communication station 108 and the second communication station 110 may enable the second communication station 110 to decode/decrypt all the network traffic meant for first communication station 108 in an optimized way. The encryption and decryption of the data stream with a devised key exchange protocol to secure the network in the communication system 104 is described in detail, for example, in FIGS. 3A, 3B, and 3C.

In accordance with another embodiment, the data streaming station 102 may be configured to authenticate the second communication station 110 as a valid station based on a response received from the second communication station 110. The second communication station 110 may be authenticated based on a validation of the response that is encrypted by a security key preset on the data streaming station 102 and the second communication station 110. The key exchange protocol between the data streaming station 102 and the second communication station 110 may enable the second communication station 110 to decode/decrypt all the network traffic originated from data streaming station 102 and meant for first communication station 108 in an optimized way.

In accordance with an embodiment, the first communication station 108 may be configured to share a temporal key with the second communication station 110, via the wireless access point 106, based on the authentication of the second communication station 110 and the received mirroring request. The secure authentication of the second communication station 110 based on the key exchange protocol further establishes a secure wireless network (e.g., the WLAN 112). An example of the temporal key may be a Pairwise Transient Key (PTK). In some embodiments, the first communication station 108 may be configured to assign a validity period to the temporal key when the temporal key is shared with the second communication station 110. The second communication station 110 may be configured to transmit a second acknowledgement signal to the first communication station 108, via the wireless access point 106. The second acknowledgement signal may be transmitted in response to a receipt of the temporal key from the first communication station 108. In an event when the validity period for the shared temporal key is over, the first communication station 108 may be further configured to negotiate with the second communication station 110 to assign a new temporal key based on an expiry of the assigned validity period of the shared temporal key. The sharing of the temporal key and the transmission of the acknowledgement signals ensure that the WLAN 112 is a secured network.

In accordance with another embodiment, the data streaming station 102 may be configured to share a temporal key with the second communication station 110, via the wireless access point 106, based on the authentication of the second communication station 110 and the received mirroring request. The secure authentication of the second communication station 110 based on the key exchange protocol further establishes a secure wireless network (e.g., the WLAN 112). An example of the temporal key may be a Pairwise Transient Key (PTK). In some embodiments, the data streaming station 102 may be configured to assign a validity period to the temporal key when the temporal key is shared with the second communication station 110. The second communication station 110 may be configured to transmit a second acknowledgement signal to the data streaming station 102, via the wireless access point 106. The second acknowledgement signal may be transmitted in response to a receipt of the temporal key from the data streaming station 102. In an event when the validity period for the shared temporal key is over, the data streaming station 102 may be further configured to negotiate with the second communication station 110 to assign a new temporal key based on an expiry of the assigned validity period of the shared temporal key. The sharing of the temporal key and the transmission of the acknowledgement signals ensure that the WLAN 112 is a secured network.

The second communication station 110 may be further configured to capture the data packets of the encrypted data stream, via the wireless access point 106, based on the radio frequency monitoring of the network traffic in the same RF channel of the first communication station 108. Therefore, the second communication station 110 may be configured to receive the data packets at a data rate that is similar to a unicast data rate for transmission of the data packets from the data streaming station 102 to the first communication station 108. The second communication station 110 may be further configured to decrypt the captured data packets of the encrypted data stream, based on the shared temporal key. The encrypted data packets from the data streaming station 102 may be decrypted on the second communication station 110 such that a difference between the first data rate and the unicast data rate may be a minimum.

The second communication station 110 may be configured to decrypt the data stream from the data streaming station 102 that was meant for the first communication station 108 based on the key exchange protocol (as described in FIGS. 3A, 3B, and 3C) between the first communication station 108 and the second communication station 110. The use of the key exchange protocol to authenticate and share the temporal key with the second communication station 110 may indicate that the WLAN 112 is secure from wireless rogue devices (i.e. devices that spy and/or steal data in a network) and a possible security breach. Also, it may save the WLAN 112 from the additional overhead on the traffic present in the WLAN 112. Further, a legitimate traffic may be monitored on a plurality of stations for security monitoring in the WLAN 112.

In the WLAN 112, the operations of the nodes (i.e. the data streaming station 102, the first communication station 108 and the second communication station 110) and the hub (i.e. the wireless access point 106) may remain agnostic of a configuration, i.e. a network topology associated with the WLAN 112. However, as shown in FIG. 1, the nodes and the hub may be present in a star network topology. Also, in some embodiments, the nodes and the hub may be present in the WLAN 112 in other network topologies, for example, a "Mesh" network topology, where each node communicates directly to other nodes and hub in the WLAN 112. In such configuration, the nodes may have to operate in ad hoc mode.

Although FIG. 1A has been described to cover a scenario with only a single communication system accesses a data stream from the data streaming station 102. However, the disclosure may not be so limited and there may be multiple communication systems, with each one having a dedicated unicast station (or node), a plurality of RFMON stations (nodes), and a dedicated wireless access point. Such a scenario has been further described, for example, in FIG. 1B.

Figure 1B:
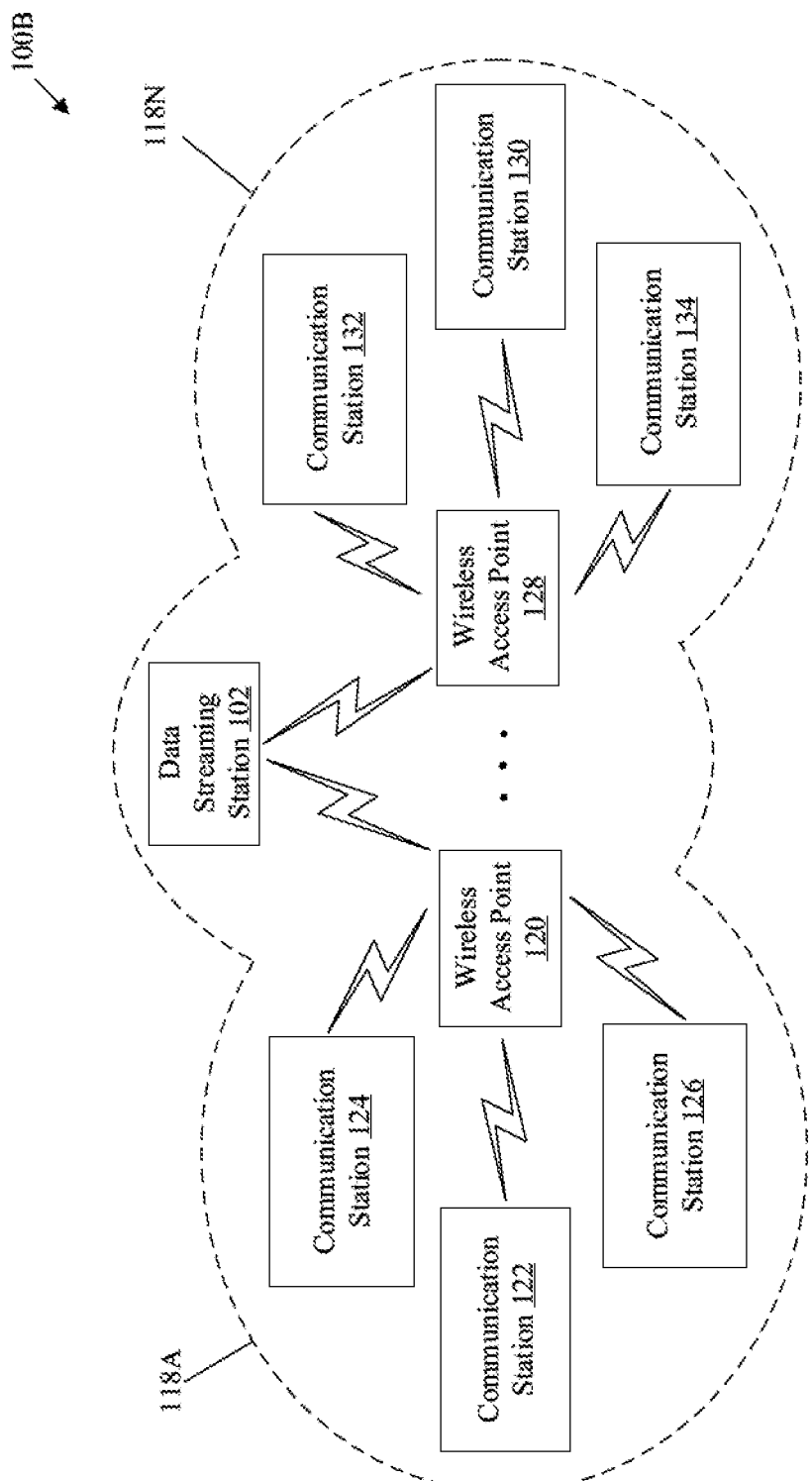
FIG. 1B illustrates a network environment for a virtual broadcast of unicast data stream among multiple unicast communication stations in a secured WLAN, in accordance with an embodiment of the disclosure.

FIG. 1B illustrates a network environment for a virtual broadcast of unicast data stream among multiple unicast communication stations in a secured WLAN, in accordance with an embodiment of the disclosure. FIG. 1B is explained in conjunction with the elements of FIG. 1A. With reference to FIG. 1B, there is shown a network environment 100B that includes a plurality of communication systems 118A . . . 118N. The communication system 118A may include a wireless access point 120, a communication station 122, a communication station 124, and a communication station 126. The communication system 118N may include a wireless access point 128, a communication station 130, a communication station 132, and a communication station 134. As shown, the data streaming station 102 may be part of the WLAN of the plurality of communication systems 118A . . . 118N.

In accordance with an embodiment, the plurality of communication systems 118A . . . 118N may be communicatively coupled to the data streaming station 102. In the communication system 118A, the communication station 122, the communication station 124, and the communication station 126 may communicate wirelessly with the wireless access point 120 for transmission of data streams. Similarly, in the communication system 118N, the communication station 130, the communication station 132, and the communication station 134 may communicate wirelessly with the wireless access point 128 for transmission of data streams.

The plurality of communication systems 118A . . . 118N may be configured to communicate with the data streaming station 102 to receive same or different data streams. Each communication system of the plurality of communication systems 118A . . . 118N may have a dedicated unicast node (i.e. a dedicate unicast station, such as the communication station 122) among a plurality of nodes (i.e. the communication station 124 and the communication station 126). The operations of each of the plurality of communication systems 118A . . . 118N may be similar to that of the communication system 104, as described in FIG. 1A. Therefore, the details of the plurality of communication systems 118A . . . 118N has been omitted for the sake of brevity.

Figure 1C:
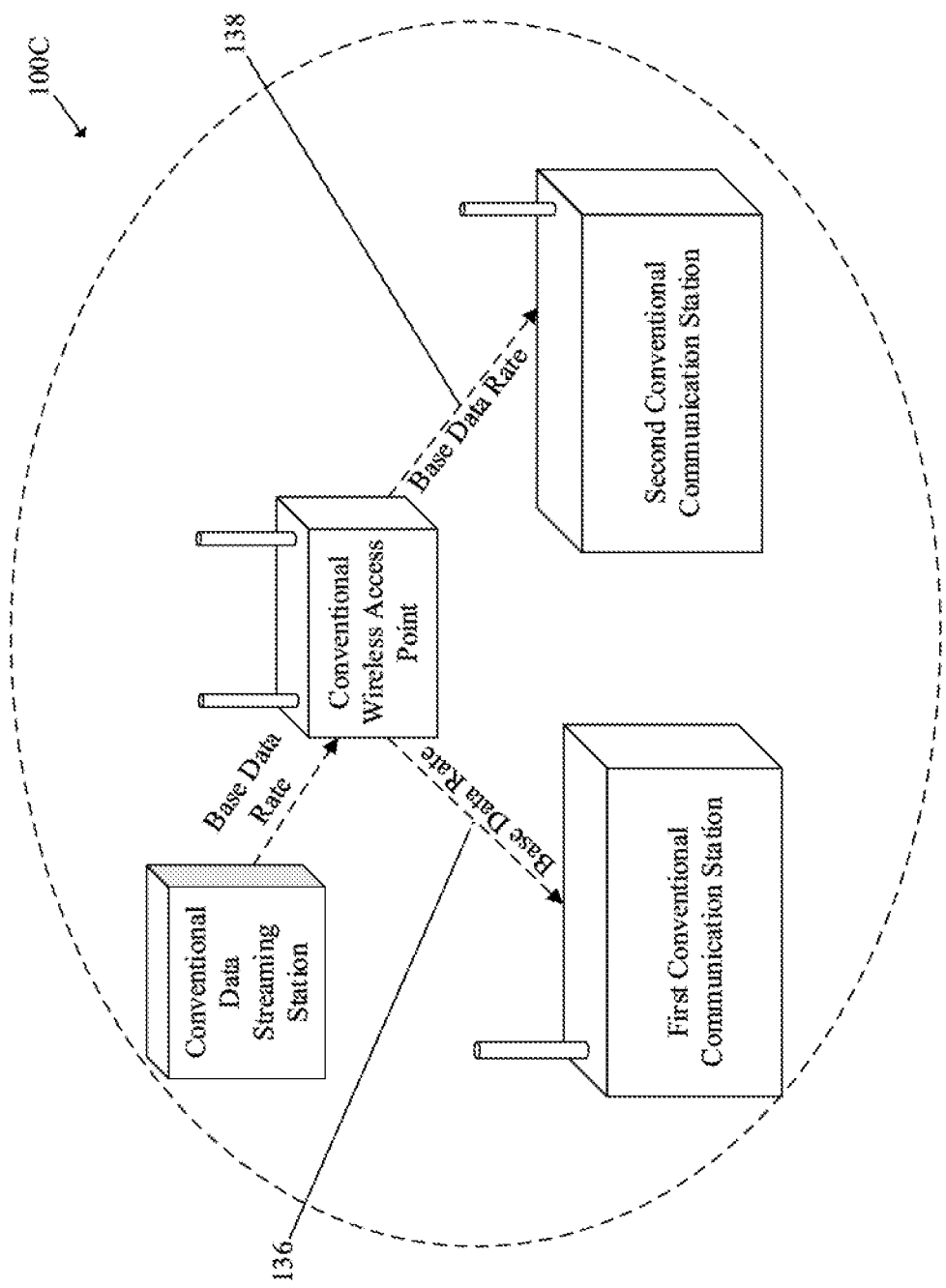
FIG. 1C illustrates a conventional broadcast scenario for transmission of a data stream to different nodes in a wireless local area network.

FIG. 1C illustrates a conventional broadcast scenario for transmission of a data stream to different nodes in a wireless local area network. FIG. 1C is a prior art that describes the challenges in the operation of a conventional WLAN network when operational in the broadcast mode. With reference to FIG. 1C, there is shown a conventional network environment that typically depicts a broadcast scenario. The network environment 100C may include a conventional data streaming station, a conventional wireless access point, a first conventional communication station, and a second conventional communication station. A data stream may be broadcasted from the conventional data streaming station to the first conventional communication station and the second conventional communication station, via the conventional wireless access point in a conventional wireless local area network (WLAN). The dotted lines 136 and 138 show that the data stream is broadcasted at a base data rate.

Typically, different wireless clients (like, the first conventional communication station and the second conventional communication station) negotiate different data rates with a wireless router or wireless access point (like, the conventional wireless access point), based on the wireless modes, distance, and noise level (the level of interference from other wireless transmissions). The data rate between the conventional wireless access point and a plurality of conventional stations, (like the first conventional communication station and the second conventional communication station) would be expected to be a maximum possible speed as per an IEEE standard, for e.g., "54 Mbps" for IEEE 802.11g or standards that date prior to 802.11g. However, the actual data transfer speed would be very low, e.g., "2 Mbps" which is very low rate of transmission as compared to actual bandwidth available to the conventional network. The reason for a huge difference between the "expected" and "actual" data rates may include high overhead involved in wireless connections as lots of bits may be used for communicating background technical information other than the actual data stream. The data retransmission due to the inherent unreliability of a wireless connection may also be a reason for lower data transmission rates. The base rate of "2 Mbps" may not be sufficient for transmission of high bandwidth video stream and may be a major constraint in the broadcast scenario in the conventional WLAN.

Figure 1D:
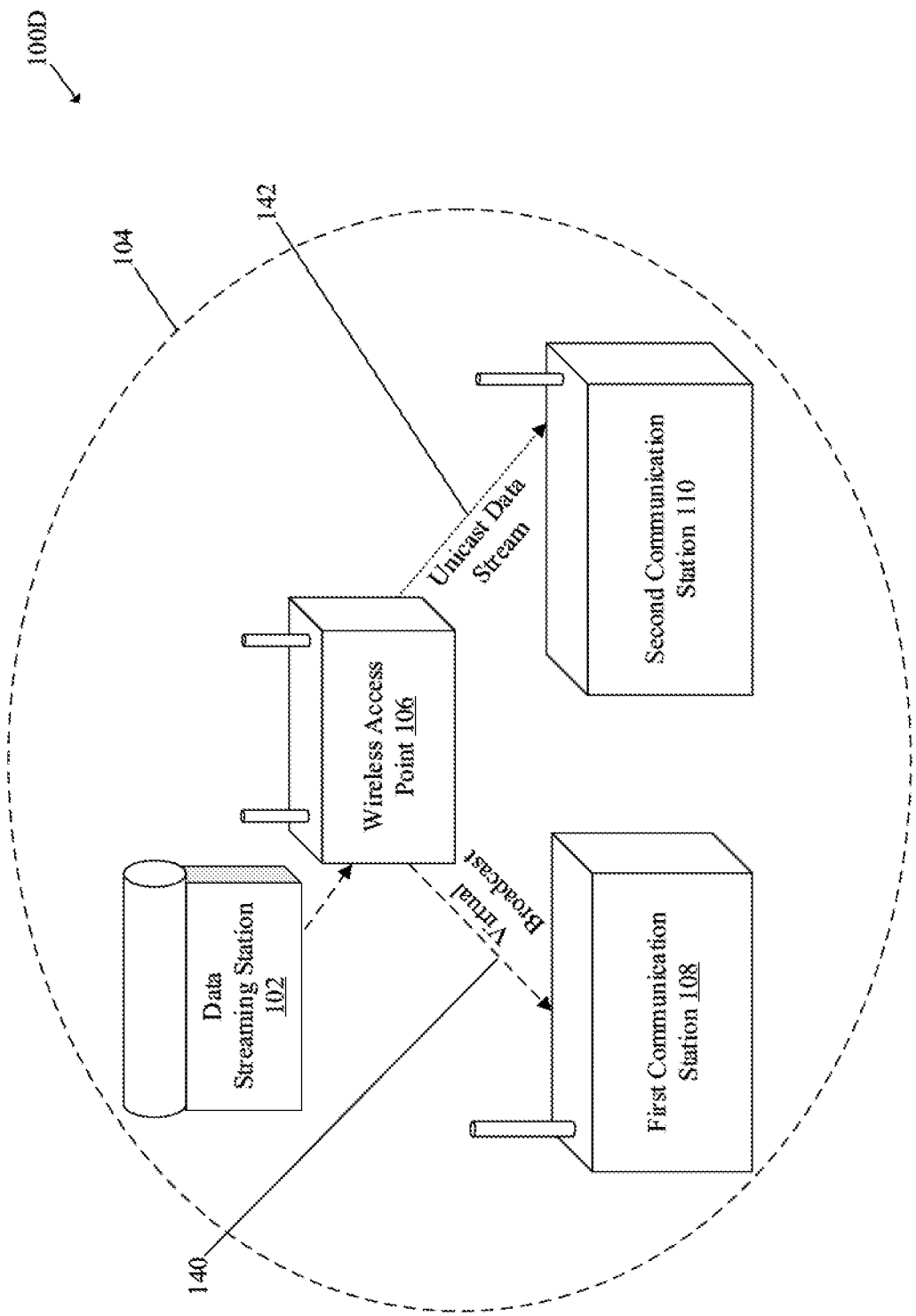
FIG. 1D illustrates an exemplary network environment, where a virtual broadcast of unicast data stream occurs among different nodes in a secured wireless local area network, in accordance with an embodiment of the disclosure.

FIG. 1D illustrates an exemplary network environment, where a virtual broadcast of unicast data stream occurs among different nodes in a secured wireless local area network, in accordance with an embodiment of the disclosure. FIG. 1D is explained in conjunction with elements of FIG. 1A and FIG. 1B. With reference to FIG. 1D, there is shown a network environment 100D that depicts a virtual broadcast of a unicast data stream in the secured WLAN 112. The network environment 100D may include the data streaming station 102, the wireless access point 106, the first communication station 108, and the second communication station 110. The data streaming station 102, the wireless access point 106, the first communication station 108, and, the second communication station 110 may be part of a common wireless network, such as the WLAN 112. A data stream may be unicasted from the data streaming station 102 to the first communication station 108 and the second communication station 110, via the wireless access point 106 in the WLAN 112. A dotted arrow mark 140 represents that the data stream may be unicasted from the data streaming station 102 to the first communication station 108. A dotted arrow mark 142 represent virtually broadcasted unicast data stream from the data streaming station 102 to the second communication station 110. In the unicast scenario, the data stream may be transmitted from one point to another point and there may be just one sender (the data streaming station 102) and one receiver (the first communication station 108) in the WLAN 112 or within the communication network 114 (not shown in the FIG. 1C). Alternatively stated, only one node may be involved in transmission and only one node in reception of the data stream in the unicast scenario.

In FIG. 1D, the data stream unicasted from the data streaming station 102 to the first communication station 108 via the wireless access point 106 may utilize a maximum bandwidth available (e.g., "54 Mbps" for IEEE 802.11g) in the WLAN 112. The first communication station 108 may send an acknowledgement signal to the data streaming station 102, via the wireless access point 106, based on receipt of the data stream at the first communication station 108 that makes the WLAN 112 a secure network. The data streaming station 102 may know whether the first communication station 108 has received the data stream or not, based on the acknowledgement signal from the first communication station 108. The maximum bandwidth available may be utilized for unicast of the data stream from the data streaming station 102 to the first communication station 108 in the WLAN 112, which is shown by the dotted arrow mark 140. However, in a broadcast communication system, more than one node may be involved that may result in decreased data rate at various nodes/stations involved.

In accordance with an embodiment, the first communication station 108 may act as a mirrored station and the second communication station 110 may act as a mirroring station that may try to mirror the first communication station 108 to receive the data stream. In a secure network, the data streaming station 102 may transmit an encrypted data stream with a temporal key. The wireless access point 106 may decrypt the data stream with the temporal key when the temporal key is known to the wireless access point 106. The wireless access point 106 may again re-encrypt the data stream with a new temporal key to transmit the data stream to the second communication station 110. The second communication station 110 may receive the encrypted data stream and may decrypt the data stream when the new temporal key may be known to the second communication station 110. The new temporal key may be known to the wireless access point 106 and the first communication station 108. The second communication station 110 knows the new temporal key of the first communication station 108 to sniff the data stream unicasted from the first communication station 108 to the data streaming station 102. For this purpose, a key exchange protocol (as described in detail in FIGS. 3A, 3B, and 3C) may be used between the first communication station 108 and the second communication station 110.

Further, a requirement for the second communication station 110 to sniff the data stream transmitted from the wireless access point 106 is that the first communication station 108 and the second communication station 110 may have to operate in same RF channel in the WLAN 112. The second communication station 110 may act as a RF Monitoring (RFM) station. The dotted arrow mark 142 depicts that the data stream may be sniffed at the second communication station 110 at the data rate similar to the first communication station 108 that acts as the unicast node. Unlike, the broadcast system in the wireless network, the data rate may not fall to the base data rate (e.g., "2 Mbps") as the WLAN 112 may still be operational in the unicast mode. The maximum bandwidth of the wireless network may be utilized at the RF monitoring station (the second communication station 110). The RF monitoring at the second communication station 110 for virtual broadcast in wireless network and reconstruction of data stream after RF monitoring in a secure network may be explained in detail in FIG. 2 and FIG. 3.

Figure 1E:
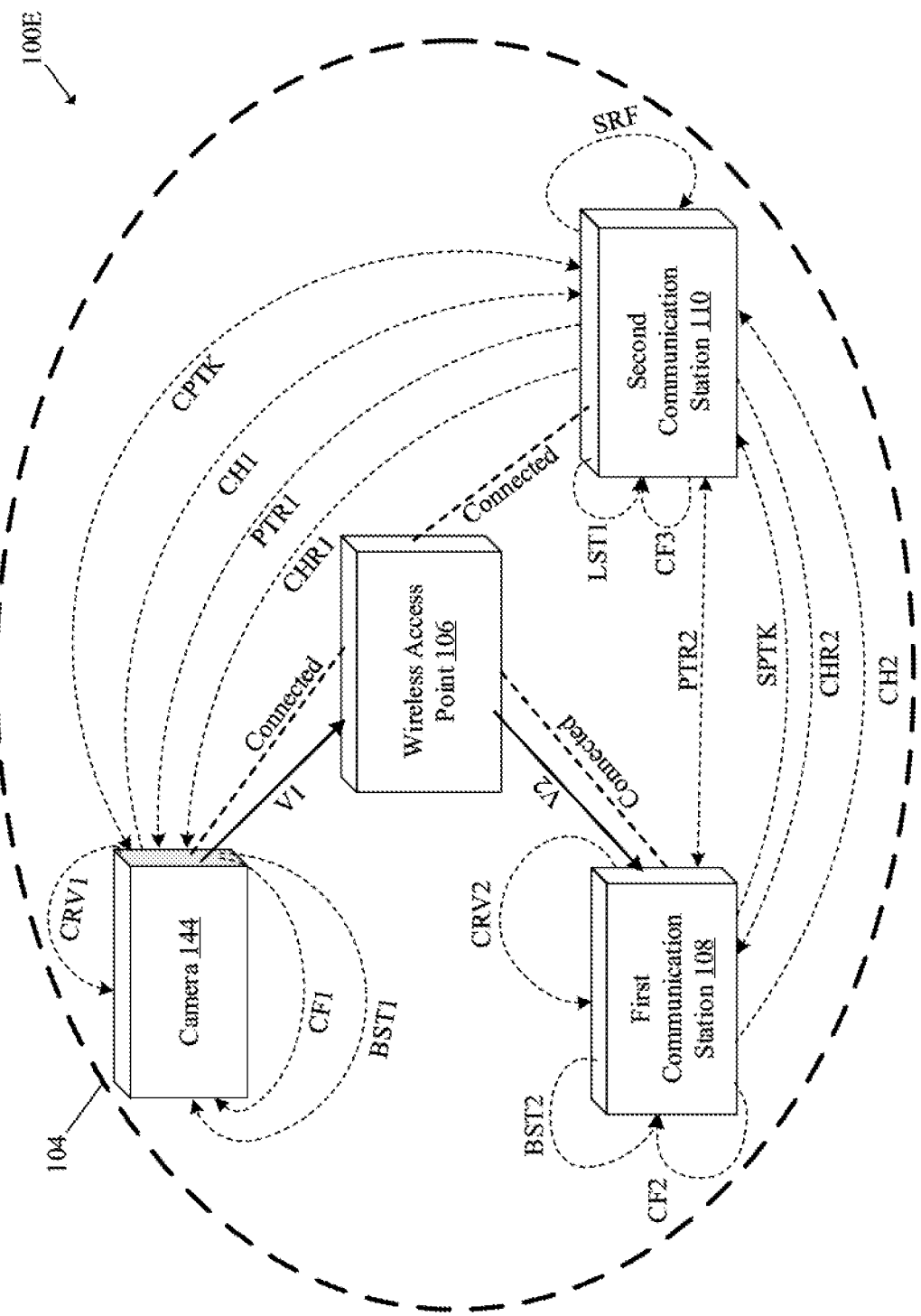
FIG. 1E illustrates an exemplary interaction between among nodes in a network environment for a virtual broadcast of unicast data stream in a secured wireless local area network (WLAN), in accordance with an embodiment of the disclosure.

FIG. 1E illustrates an exemplary interaction diagram among multiple nodes in a secured wireless local area network (WLAN), in accordance with an embodiment of the disclosure. FIG. 1E is explained in conjunction with elements from FIGS. 1A, 1B, and 1D. With reference to FIG. 1E, there is shown an interaction diagram 100E that depicts the communication system 104. There is shown a camera 144, the wireless access point 106, the first communication station 108, and the second communication station 110.

In the interaction diagram 100E, the camera 144 acts as a data streaming node (such as the data streaming station 102), the first communication station 108 acts as a unicast node, and the second communication station 110 acts as a RFMON node. The first communication station 108, the second communication station 110, and the camera 144 may be connected to the wireless access point 106 as part of a common WLAN (such as WLAN 112). The first communication station 108 may be configured to decrypt and decode encrypted data packets of the data stream from the camera 144 using a pairwise temporal key (PTK) received from the wireless access point 106. The second communication station 110 may need access to a temporal key (such PTK) to decrypt and decode the same encrypted data packets in RFMON mode. With secure access to the data stream, the camera 144 and the first communication station 108 may be configured to broadcast a first video session beacon (represented by BST1) and a second video session beacon (BST2), respectively, to all the peer nodes, such as the second communication station 110, in the WLAN. The video session beacons (BST1 and BST2) may be broadcasted periodically at specific time intervals, e.g., "200" milliseconds. The peer nodes, such as the second communication station 110, may be configured to listen (represented by LST1) to the video session beacons (BST1 and/or BST2).

In accordance with an embodiment, the second communication station 110 may be configured to transmit a mirroring request (PTR2) to the first communication station 108 in response to the receipt of the video session beacon (BST2) from the first communication station 108. The mirroring request may correspond to a request to access a PTK from the first communication station 108. The PTK may be required to decrypt the encrypted data packets of the data stream that are unicasted to the first communication station 108, via the wireless access point 106. The first communication station 108 may be configured to transmit challenge information (CH2) to the second communication device 110. The second communication station 110 may be further configured to transmit a response (CHR2) based on the challenge information. The first communication station 108 may be further configured to validate the response (CRV2) received from the second communication station 110. In response to a successful validation of the response, the first communication station 108 may be configured to transmit the PTK (represented by SPTK) to the second communication station 110. The second communication station 110 may be further configured to initialize an RFMON mode (represented by SRF) to capture encrypted data packets and further decrypt the encrypted data packets to reconstruct the data stream, based on the receipt of the PTK.

In accordance with another embodiment, the second communication station 110 may be configured to transmit a mirroring request (PTR1) to the camera 144 in response to the receipt of the video session beacon (BST1) from the camera 144. The mirroring request may correspond to a request to access a PTK from the camera 144. The PTK may be required to decrypt the encrypted data packets of the data stream that are unicasted to the first communication station 108, via the wireless access point 106. The camera 144 may be configured to transmit challenge information (CH1) to the second communication station 110. The second communication station 110 may be configured to transmit a response (CHR1) based on the challenge information. The camera 144 may be configured to validate the response (CRV1) received from the second communication station 110. In response to a successful validation of the response, the camera 144 may be configured to transmit the PTK (represented by CPTK) to the second communication station 110. The second communication station 110 may be further configured to initialize an RFMON mode (represented by SRF) to capture encrypted data packets and further decrypt the encrypted data packets to reconstruct the data stream, based on the receipt of the PTK. Although in FIG. 1E, the camera 144 acts as the data streaming station; however, in some embodiments, the data streaming station may be any data communication device.

Figure 2:
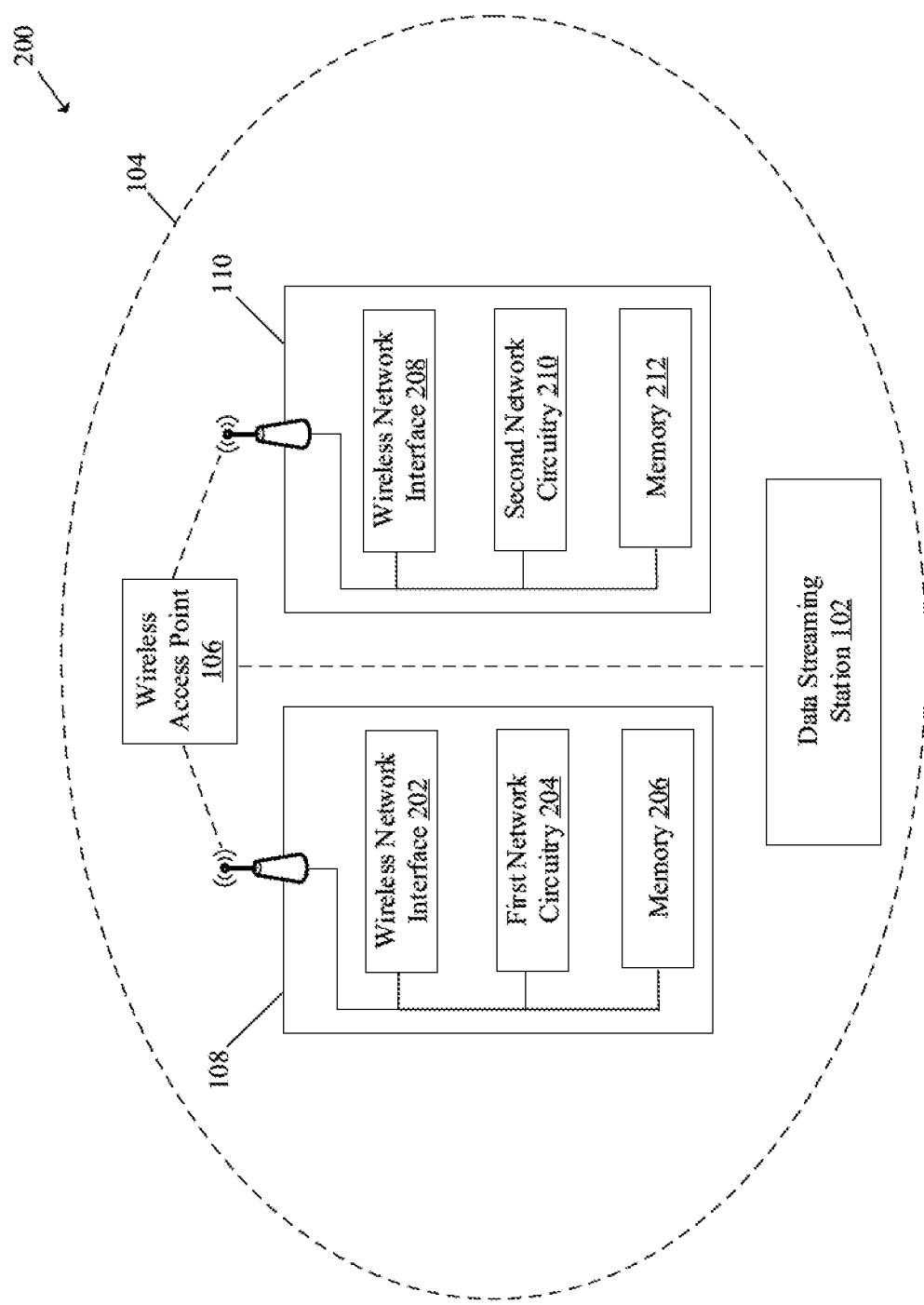
FIG. 2 illustrates a block diagram of an exemplary communication system for a virtual broadcast of unicast data stream in secured WLAN, in accordance with an embodiment of the disclosure.

FIG. 2 illustrates a block diagram of an exemplary communication system for a virtual broadcast of unicast data stream in secured WLAN, in accordance with an embodiment of the disclosure. FIG. 2 is explained in conjunction with the elements of FIG. 1A, FIG. 1B, FIG. 1D, and FIG. 1E. With reference to FIG. 2, there is shown a block diagram 200 of the communication system 104 that includes the wireless access point 106, the first communication station 108, and the second communication station 110. The first communication station 108 may include a wireless network interface 202, one or more circuitries, such as a first network circuitry 204 and a memory 206. The second communication station 110 may include a wireless network interface 208, one or more circuitries, such as a second network circuitry 210 and a memory 212. The wireless network interface 202 may communicate with data streaming stations, such as the data streaming station 102, via the wireless access point 106, under the control of the first network circuitry 204. Also, the wireless network interface 208 may communicate with data streaming stations, such as the data streaming station 102, via the wireless access point 106, under the control of the first network circuitry 204.

The wireless network interface 202 may comprise suitable logic, circuitry, and interfaces that may be configured to communicate with the data streaming station 102 and the second communication station 110, via the wireless access point 106, as shown in FIG. 1A. The wireless network interface 202 may correspond to a wireless network interface controller (WNIC) that may operate in the first two layers (i.e., the physical layer and the data link layer) of the open system interconnection (OSI) model, as an 802.11 network adaptor. The wireless network interface 202 may implement known technologies to support wireless communication of the first communication station 108. The wireless network interface 202 may include, but is not limited to an antenna, a radio frequency (RF) transceiver, one or more amplifiers, a tuner, one or more oscillators, a digital signal processor, a coder-decoder (CODEC) chipset, a subscriber identity module (SIM) card, and/or a local buffer.

The first network circuitry 204 may comprise suitable logic, circuitry, and interfaces that may be configured to manage data communication requirements of the first communication station 108. The data communication requirements may include, but are not limited to, wireless network configuration, wireless channel access, device registration on the WLAN 112, access to data packets, decryption, and data stream reconstruction, device authentication using a key exchange protocol, and the like. The first network circuitry 204 may be implemented based on different processor technologies known in the art and wireless network adaptors, and specialized network circuits. Examples of the first network circuitry 204 may be an x86-based processor, x86-64-based processor, a Reduced Instruction Set Computing (RISC) processor, an Application-Specific Integrated Circuit (ASIC) processor, a Complex Instruction Set Computing (CISC) processor, a central processing unit (CPU), an Explicitly Parallel Instruction Computing (EPIC) processor, a Very Long Instruction Word (VLIW) processor, and/or other processors or circuits.

The memory 206 may comprise suitable logic, circuitry, and/or interfaces that may be configured to store a set of instructions executable by the first network circuitry 204. The memory 206 may be configured to store the data packets of the data stream received from the data streaming station 102, via the wireless network interface 202. The memory 206 may be further configured to store metadata (e.g., a station list, key information, etc.) related to security key exchange protocol between the first communication station 108 and a plurality of RF monitoring stations, like the second communication station 110. The memory 206 may be further configured to store operating systems and associated applications. Examples of implementation of the memory 206 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The wireless network interface 208 may comprise suitable logic, circuitry, and interfaces that may be configured to communicate with the data streaming station 102, and the first communication station 108 via the wireless access point 106 or the communication network 114 (as shown in FIG. 1A). The wireless network interface 208 may implement known technologies to support wired or wireless communication of the second communication station 110 with the wireless access point 106 and the communication network 114. The wireless network interface 208 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, and/or a local buffer.

The second network circuitry 210 may comprise suitable logic, circuitry, and interfaces that may be configured to manage data communication requirements of the second communication station 110. The data communication requirements may include, but are not limited to, wireless network configuration, wireless channel access, device registration on the WLAN 112, RF monitoring of data packets, decryption, and data stream reconstruction, implementation of key exchange protocol, and the like. The second network circuitry 210 may be implemented based on different processor technologies known in the art. Examples of the second network circuitry 210 may be an x86-based processor, x86-64-based processor, a Reduced Instruction Set Computing (RISC) processor, an Application-Specific Integrated Circuit (ASIC) processor, a Complex Instruction Set Computing (CISC) processor, a central processing unit (CPU), an Explicitly Parallel Instruction Computing (EPIC) processor, a Very Long Instruction Word (VLIW) processor, and/or other processors or circuits.

The memory 212 may comprise suitable logic, circuitry, and/or interfaces that may be configured to store a set of instructions executable by the second network circuitry 210. The memory 212 may be configured to store the data packets captured in the RF monitoring mode of the second communication station 110. The memory 212 may be further configured to store metadata related to security key exchange protocol between the first communication station 108 and the second communication station 110. The memory 212 may be further configured to store operating systems and associated applications. Examples of implementation of the memory 212 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

Although the wireless network interface 202 and the first network circuitry 204 have been illustrated as separated network components in FIG. 2; however, in some embodiments, the wireless network interface 202 may be integrated with the first network circuitry 204 and all the operations of the wireless network interface 202 may be executed by the first network circuitry 204, without an effect on the functional performance of the first network circuitry 204. Similarly, in some embodiments, the wireless network interface 208 may be integrated with the second network circuitry 210 and all the operations of the wireless network interface 208 may be executed by the second network circuitry 210, without an effect on the functional performance of the second network circuitry 210.

In operation, the data streaming station 102, the first communication station 108, and the second communication station 110 may be configured to transmit a request, for a registration on the WLAN 112, to the wireless access point 106. Alternatively stated, the request may be transmitted by the first network circuitry 204 and the second network circuitry 210, for the registration of the first communication station 108, the second communication station 110, and the data streaming station 102 on the WLAN 112. The request may be transmitted via the wireless network interface 202 and the wireless network interface 208, respectively. The request for the registration may correspond to an authentication request of the first communication station 108 and the second communication station 110, and the data streaming station 102 to access data packets (as per 802.11 standards) from data streaming stations (such as the data streaming station 102), via the wireless access point 106.

The wireless access point 106 may be configured to register the first communication station 108, the second communication station 110, and the data streaming station 102 based on a security key preset on the first communication station 108 and the second communication station 110, and the data streaming station 102. In accordance with an embodiment, the preset security key may be a Wireless Protected Access-Pre-Shared Key (WPA-PSK), WPA2-PSK, WPA3, Temporal Key Integrity Protocol (TKIP), Advanced Encryption Standard (AES), or any other encryption protocols/standards. The preset security key may be shared among all the nodes (i.e. the first communication station 108, the second communication station 110 and the data streaming station 102) and hubs (i.e. the wireless access point 106) that are part of the WLAN 112. The preset security key may be generated at the wireless access point 106 based on a symmetric cryptographic technique or an asymmetric cryptographic technique. For example, the preset security key may be one of a password, a passphrase, or a hexadecimal string.

As both the first communication station 108 and the second communication station 110 are registered on the WLAN 112, the first communication station 108 may be selected as a unicast node and the second communication station (or other stations on the WLAN 112) may be configured to operate in RFMON mode (as described in FIGS. 1A, 1B, 1D, and 1E). The first network circuitry 204 may be configured to receive a plurality of encrypted data packets of the data stream (also referred to as an encrypted data stream) from the data streaming station 102, via the wireless access point 106.

The first network circuitry 204 be further configured to transmit a first acknowledgement signal to the data streaming station 102, via the wireless access point 106. The transmission of the first acknowledgement signal from the first network circuitry 204 may be done based on a receipt of the encrypted data stream, via the wireless access point 106. The transmission of the first acknowledgement signal informs the wireless access point 106 and/or the data streaming station 102 whether the transmitted data packets have been securely and successfully received at the first communication station 108. Based on the receipt of the acknowledgement signal, the data streaming station 102 may know whether to transmit the next data packet associated with the data stream or to retransmit the previously transmitted data packets.

The second network circuitry 210 may be configured to sniff (or mirror) the data stream unicasted to the first communication station 108, from the data streaming station 102, via the wireless access point 106, without a compromise in a data rate of the transmission of the data packets and a security of the WLAN 112. The pertinent requirement for the second communication station 110 to sniff the data stream of the first communication station 108 may be that the first communication station 108 and the second communication station 110 must operate in the same RF channel allocated by the wireless access point 106, also referred to as a first RF channel in the WLAN 112.

The second network circuitry 210 may be configured to transmit a mirroring request to the first communication station 108, via the wireless access point 106 to sniff the data stream of the first communication station 108, based on a user's request. Therefore, the first communication station 108 may act as a mirrored station and the second communication station 110 may act as a mirroring station that functions or operates to mirror the first communication station 108 in the secured WLAN 112.

In accordance with an embodiment, the data stream unicasted from the data streaming station 102 to the first communication station 108, via the wireless access point 106 at a unicast data rate may be encrypted in the form of data packets. In some embodiments, the data stream unicasted from the data streaming station 102 to the first communication station 108 may be transmitted without encryption, via the wireless access point 106. The mirroring request from the second communication station 110 to the first communication station 108 may correspond to a request to decrypt the data stream from the data streaming station 102 at the second communication station 110, via the wireless access point 106. The mirroring request from the second communication station 110 may be transmitted over a data packet (e.g. Wi-Fi packets), based on a key exchange protocol (as described, for example, in FIGS. 3A, 3B, and 3C) between the first communication station 108 and the second communication station 110. The mirroring request from the second communication station 110 may be transmitted over a data packet that may be encrypted by a security key, to the first communication station 108.

The first network circuitry 204 may be configured to receive the mirroring request from the second network circuitry 210, via the wireless access point 106 to decrypt the data stream transmitted by the data streaming station 102. Based on the received mirroring request from the second communication station 110, the first network circuitry 204 may be configured to transmit challenge information to the second network circuitry 210 of the second communication station 110. The challenge information may be transmitted from the first network circuitry 204 to the second network circuitry 210 in order to verify whether the second communication station 110 is a valid station that is connected on the WLAN 112 and whether configured with the same security key as with the first communication station 108. The challenge information may include a specific task information based on which the second communication station 110 may be requested to transmit the response. The challenge information may be user configurable to ensure that the mirroring request is received from the valid station and that the mirroring request may be a legitimate request. In some embodiments, the challenge information may require the second network circuitry 210 to respond to a question, such as "What is your Wi-Fi password?" In other embodiments, the challenge information may require the second network circuitry 210 to respond to a set of questionnaires, a captcha, a pin lock, a pattern lock, and the like.

The second network circuitry 210 of the second communication station 110 may be further configured to transmit a response to the first network circuitry 204 based on the challenge information received from the first communication station 108. In some embodiments, the transmitted response from the second network circuitry 210 answers the password to the question asked as the challenge information from the first communication station 108. In other embodiments, the transmitted response from the second network circuitry 210 may include a user's input to the set of questionnaires, a captcha, the pin lock, the pattern lock, and the like.

Figure 3A:
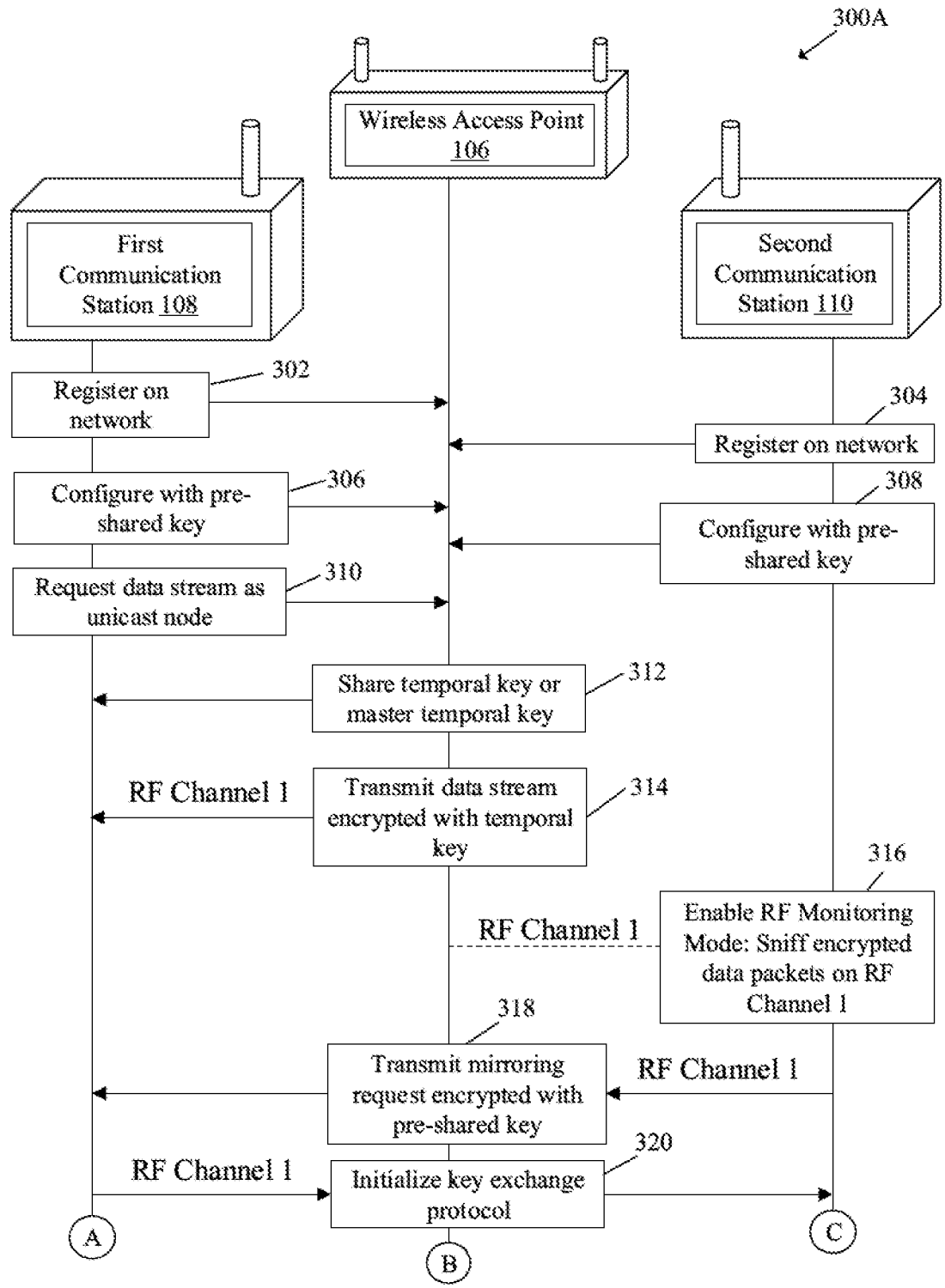
FIGS. 3A to 3C, collectively, depicts a sequence diagram for a custom key exchange protocol for a virtual broadcast of unicast data stream in a secured WLAN, in accordance with an embodiment of the disclosure.
Figure 3B:
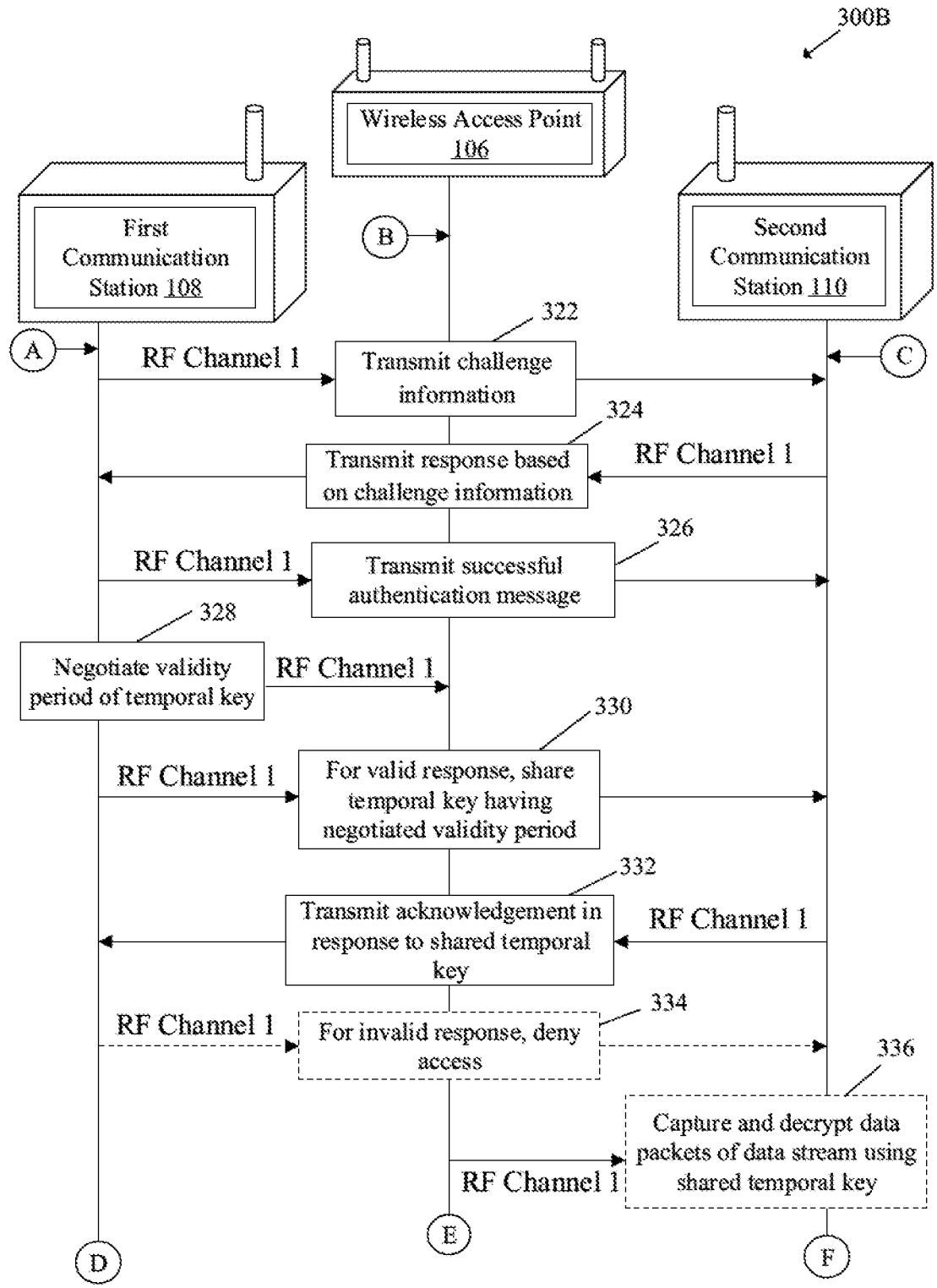
Figure 3C:
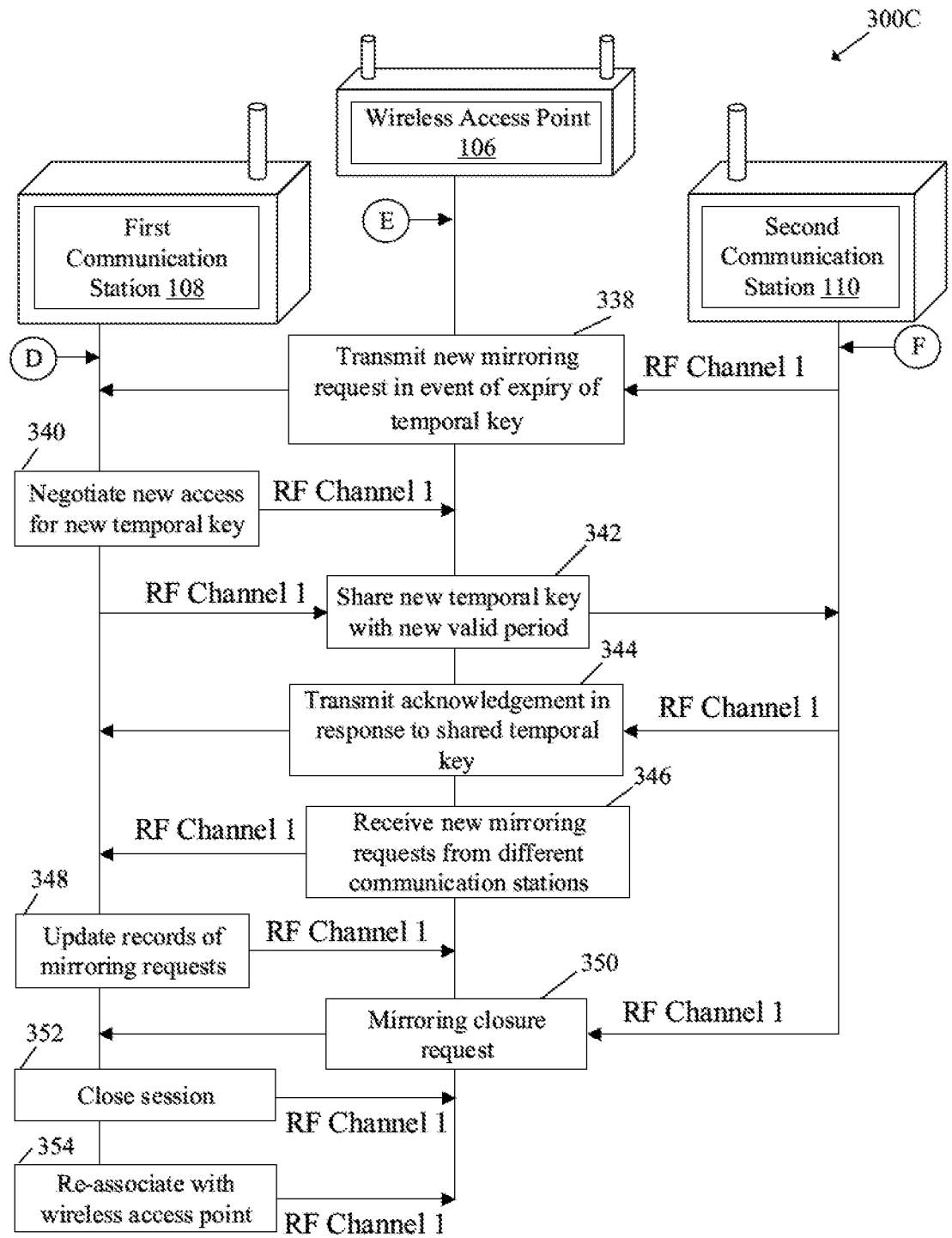

The first network circuitry 204 may be further configured to validate the response received from the second network circuitry 210 of the second communication station 110 based on validation criteria specified in a key exchange protocol (as described, for example, in FIGS. 3A, 3B, and 3C). The validation criteria may specify a first requirement for a match of the response received from the second network circuitry 210 with an expected response stored on the first communication station 108. The validation criteria may further specify a second requirement for a decryption of the response received based on the preset security key on the first communication station 108. Also, the validation criteria may specify a third requirement for a connection of the first communication station 108, the second communication station 110, and the wireless access point 106 on the WLAN 112.

The response may be validated by the first communication station 108 to share a temporal key with the second communication station 110. The validation of the response may correspond to the authentication of the second communication station 110. The temporal key may be shared by the first network circuitry 204 of the first communication station 108 with the second network circuitry 210 of the second communication station 110, via the wireless access point 106, based on the validation of the response. Consequently, the first communication station 108, the second communication station 110, and the wireless access point 106 may share the same temporal key.

In some embodiments, the first network circuitry 204 may be further configured to invalidate the response received from the second network circuitry 210 of the second communication station 110, based on validation criteria specified in a key exchange protocol. Therefore, the first network circuitry 204 of the first communication station 108 may deny the second network circuitry 210 of the second communication station 110 to access the temporal key based on an invalidation of the response received from the second network circuitry 210. Therefore, the first network circuitry 204 of the first communication station 108 may be configured to authenticate the second communication station 110 as a valid station based on a response received from the second communication station 110. The second communication station 110 may be authenticated based on validation of the response that is encrypted by a security key preset on the first communication station 108 and the second communication station 110.

The first network circuitry 204 may be configured to share a temporal key with the second communication station 110, via the wireless access point 106, based on the authentication of the second communication station 110 and the received mirroring request. In some embodiments, the temporal key may be a pairwise transient key (PTK) that may be derived by the first network circuitry 204 based on a pairwise master key (PMK) stored in the memory 206 of the first communication station 108 and the wireless access point 106. The PTK and the PMK may be used in the WLAN 112 based on Temporal Key Integrity Protocol (TKIP) as part of 802.11i standard.

The second network circuitry 210 may be further configured to transmit a second acknowledgement signal to the first communication station 108 when the temporal key may be shared by the first communication station 108 with the second network circuitry 210. This may be considered as one part of the key exchange between the first communication station 108 and the second communication station 110. Further, the second network circuitry 210 may be further configured to mirror the first communication station 108 based on certain spectral requirements for mirroring. Therefore, to meet the spectral requirements for mirroring, the first communication station 108, the second communication station 110 and the wireless access point 106 must be in the same radio frequency (RF) channel of the WLAN 112.

The second network circuitry 210 of the second communication station 110 may be configured to capture data packets of the encrypted data stream at a first data rate, via the wireless access point 106, based on radio frequency monitoring (RFM) of network traffic in the same RF channel of the WLAN 112. The second network circuitry 210 of the second communication station 110 may be configured to decrypt the captured data packets of the encrypted data stream, based on the shared temporal key. The memory 212 may be configured to store the captured data packets. The encrypted data packets may be decrypted on the second communication station 110 such that a difference between the first data rate and the unicast data rate may be a minimum. In accordance with an embodiment, a first type of encryption key on the plurality of encrypted data packets from the data streaming station 102 to the wireless access point 106 may be different from a second type of encryption key on the encrypted data stream transmitted via the wireless access point 106 to the first communication station 108. As an example, if the first network circuitry 204 receives the data packets of the data stream at a unicast data rate of "54 Mbps", the second network circuitry 210 receives, decrypts, and reconstructs the data packets at nearly the same data rate of "54 Mbps" in the RFMON mode.

The second network circuitry 210 may be further configured to reconstruct the data stream that may correspond to the encrypted data stream unicasted to the first communication station 108. The data stream may be reconstructed based on the decrypted data packets captured in the same RF channel. The data stream may be reconstructed in the secured WLAN 112 such that the second communication station 110 may only be configured to capture and decrypt the data packets in the first RF channel, based on the information of the temporal key with the second communication station 110.

In accordance with an embodiment, the first network circuitry 204 may be configured to assign a validity period (e.g. "30 minutes") to the shared temporal key at a time of sharing the temporal key with the second communication station 110. The assigned validity period may span a first time at which the validity period has been assigned to a second time at which the temporal key may expire. In an event where the temporal key expires after the assigned validity period of the shared temporal key is over, an access to a new temporal key may be initialized. In some embodiments, the second network circuitry 210 may be further configured to negotiate an access to a new temporal key with the first network circuitry 204 of the first communication station 108. In the negotiation process, the first network circuitry 204 may be configured to generate the new temporal key with an updated validity period. A re-association may occur between the first communication station 108 and the wireless access point 106 when the first network circuitry 204 shares the generated new temporal key with the wireless access point 106. Further, all other authenticated stations including second communication station 110 may be configured to receive the new temporal key from the first communication station 108 post the negotiation. The new temporal key may be received at the second communication station 110 with the updated validity period.

In an exemplary embodiment, instead of only the first communication station 108 and the second communication station 110 in the communication system 104, there may be a plurality of communication stations in the communication system 104 along with the first communication station 108. The plurality of stations may include at least the second communication station 110 and a third communication station (for example, communication stations 120, 124, 130, or 134, shown in FIG. 1B). In such an implementation, the first network circuitry 204 may be further configured to authenticate the plurality of communication stations based on a corresponding mirroring request to the first communication station 108. The first network circuitry 204 may be further configured to track a number of mirroring requests received from the plurality of communication stations, via the wireless access point 106. Each mirroring request from the number of mirroring requests may correspond to a request to decrypt, at a corresponding communication station from the plurality of communication stations, the encrypted data stream that is unicasted only to the first communication station 108 at the unicast data rate (e.g., "54 Mbps").

The wireless access point 106, the first communication station 108, and the plurality of communication stations may be configured to operate in accordance with a data streaming topology. The first network circuitry 204 of the first communication station 108 may be further configured to generate a mirroring list that may include a record of the plurality of communication stations. The mirroring list may further include metadata for the temporal key that may be shared between the first communication station 108 and the plurality of stations. The memory 206 may be configured to store the mirroring request.

The first network circuitry 204 of the first communication station 108 may be further configured to update the mirroring list in accordance with a track of the plurality of communication stations. The track of the plurality of communication stations may correspond to a number of communication stations that still have access to the temporal key. The mirroring list may be further updated based on a modification in an access state (e.g., a passive access state where one or more communication stations are not accessing the data packets of the data stream) of one or more stations from the plurality of communication stations. The first network circuitry 204 may be further configured to generate the temporal key based on handshakes (or a mutual agreement) between the first communication station 108 and the wireless access point 106. The first network circuitry 204 may be further configured to share the generated temporal key with each station of the plurality of communication stations enlisted in the mirroring list.

In some embodiments, the first network circuitry 204 may be further configured to receive a mirroring closure request from one or more communication stations of the plurality of communication stations in the mirroring list, via the wireless access point 106. The first network circuitry 204 of the first communication station 108 may be further configured to close a session between the first communication station 108 and the one or more stations, based on the received mirroring closure request from the one or more stations. Based on closure of the session between the first communication station 108 and the one or more communication stations, the first network circuitry 204 of the first communication station 108 may be further configured to negotiate with the wireless access point 106 for generation of a new temporal key. The generation for the new temporal key may be negotiated to regulate a secure access of the encrypted media stream to only a set of communication stations that are updated in the mirroring list.

The set of communication stations may be RF monitoring stations that may be updated in the mirroring list after the session of the one or more stations is closed. The first network circuitry 204 of the first communication station 108 may be further configured to generate the new temporal key based on the negotiation between the wireless access point 106 and the first communication station 108. The new temporal key may be shared by the first network circuitry 204 with the set of communication stations in the mirroring list.

In accordance with an embodiment, the data streaming station 102 may be configured to apply a dynamic forward error correction (FEC) on the encrypted data stream to maximize a probability of reconstruction of the data stream from the decrypted data packets. The dynamic forward error correction may aid in control of errors in the transmission of the data stream over the communication channel, such as the first RF channel. Therefore, the wireless access point 106 in the WLAN 112 may be configured to establish a virtual broadcast of the unicast stream based on RF Monitoring of data packets, meant for the first communication station 108, by the second communication station 110 in the secure WLAN 112. Only one data stream is available at single time to the first communication station 108. However, other stations, like the second communication station 110 may be able to decrypt that data stream based on RF Monitoring and access to the temporal key.

FIGS. 3A to 3C, collectively, depicts a sequence diagram for a custom key exchange protocol for a virtual broadcast of unicast data stream in a secured WLAN, in accordance with an embodiment of the disclosure. FIGS. 3A, 3B, and 3C are collectively explained in conjunction with FIGS. 1A, 1B, 1D, 1E, and 2. With reference to FIGS. 3A, 3B and 3C, there is shown a sequence diagram 300 that illustrates the custom key exchange protocol for different communication stations (such as the second communication station 110) that need an access to the data stream unicasted to the first communication station 108. The sequence of operations may be from 302 to 354 by various elements of the communication system 104, such as the wireless access point 106, the first communication station 108 and the second communication station 110 in the WLAN 112.

At 302, the first communication station 108 may be registered on the WLAN 112. The registration may be done in the WLAN 112 by the first communication station 108. The wireless network interface 202 may act as an interface between the first communication station 108 and the wireless access point 106. The wireless network interface 202 may be configured to operate in accordance with a wireless network standard, such as 802.11b. The registration may correspond to an authentication of the first communication station 108 based on a security key, such as a WPA2-PSK key or a WPA3, preset on the first communication station 108.

At 304, the second communication station 110 may be registered on the WLAN 112. The registration of the second communication station 110 may be similar to that of the first communication station 108, as described at 302.

At 306 and 308, the first communication station 108 and the second communication station 110 may configure itself with the pre-shared key (PSK), respectively. Value of the PSK may be programmed directly into the first communication station 108, the second communication station 110, and the wireless access point 106 independently.

At 310, the first communication station 108 (as a unicast node) may be configured to request a unicast data stream from the data streaming station 102. The request may be sent to the data streaming station 102, via the wireless access point 106.

At 312, a temporal key, such as a pairwise transient key (PTK), or a master temporal key may be shared by the wireless access point 106 with the first communication station 108. For example, the temporal key may be a "128 bits" key that may be used to encrypt data packets that may be transmitted by the wireless access point 106 on the WLAN 112. An authentication may occur between the first communication station 108 and the wireless access point 106. Consequently, both the first communication station 108 and the wireless access point 106 may generate a matching PSK.

In accordance with an embodiment, the wireless access point 106 may be connected to an authentication server by a network connection managed under through a protocol, such as a Transmission Control Protocol/Internet Protocol (TCP/IP). The PSK may be transferred across the WLAN 112 through the authentication server. In accordance with an embodiment, the first communication station 108 may be further configured to verify whether the wireless access point 106 is a legitimate access point. The wireless access point 106 and the first communication station 108 must prove to each other that both possess a copy of the temporal key, for example, the PTK or the PMK.

At 314, the wireless access point 106 may be configured to transmit the data stream encrypted with the temporal key to the first communication station 108, via the wireless access point 106. Since the first communication station 108 may have the temporal key, the data stream may be decrypted by the first communication station 108. In accordance with an embodiment, the channel used to transmit the data stream between the wireless access point 106 and the first communication station 108 may be a first RF channel (represented by RF "channel 1").

At 316, the second communication station 110 may act as an RF monitoring station that sniffs data packets of the data stream transmitted by the wireless access point 106 to the first communication station 108. In order to decrypt the data packets for the data stream, the second communication station 110 must have access to the temporal key (e.g., the PTK) of the first communication station 108. The key exchange protocol may be devised to know the PTK of the mirrored station (the first communication station 108).

At 318, the second communication station 110 may be configured to transmit a mirroring request encrypted with the PSK to the first communication station 108 at the RF "channel 1". The second communication station 110 may correspond to a mirroring station. The mirroring request sent by the second communication station 110 to the first communication station 108 may be a legitimate request that may be sent as a Wi-Fi packet.

At 320, the first communication station 108 may be configured to initialize a key exchange protocol between the first communication station 108 and the second communication station 110. The purpose of the key exchange protocol may be to devise a secure mechanism to exchange the temporal key (e.g., PTK) between the first communication station 108 and the second communication station 110 in the WLAN 112. The temporal key may be shared by the first communication station 108 with the second communication station 110 only after an authentication step in the key exchange protocol. The temporal key may be computed every time the first communication station 108 may associate with the wireless access point 106 that makes the WLAN 112, a secure network.

At 322, the first communication station 108 may be configured to transmit challenge information on the RF "channel 1" to the second communication station 110, via the wireless access point 106. The first communication station 108 may be configured to transmit the challenge information to the second communication station 110 to ensure that the mirroring request is a legitimate request from an registered communication station (such as, the second communication station 110). The challenge information transmitted by the first communication station 108 to the second communication station 110 may be user-configurable. More specifically, a user's input may specify a type of challenge information that could be transmitted to the second communication station 110.

At 324, the second communication station 110 may be configured to transmit a response based on the challenge information, over the RF "channel 1", to the first communication station 108, via the wireless access point 106.

At 326, the first communication station 108 may be configured to transmit a successful authentication message, over the RF "channel 1", to the second communication station 110, via the wireless access point 106. The first communication station 108 may be configured to check the validity of the response sent by the second communication station 110. Based on the valid response from the second communication station 110, the first communication station 108 may transmit the successful authentication message to the first communication station 108.

At 328, the first communication station 108 may be configured to negotiate a validity period of the temporal key that may be shared by the first communication station 108 with the second communication station 110.

At 330, the first communication station 108 may be configured to share a temporal key (e.g., a PTK) with a negotiated validity period with the second communication station 110, based on a valid response. Now, both the first communication station 108 and the second communication station 110 may have the same temporal key (PTK).

At 332, the second communication station 110 may be configured to transmit an acknowledgement signal to the first communication station 108, based on a receipt of the temporal key (PTK). The transmission of the acknowledgement signal may be part of a security measure established for the WLAN 112, in accordance with the key exchange protocol.

At 334, the first communication station 108 may be configured to deny access to the second communication station 110 based on an invalid response from the second communication station 110. In accordance with an embodiment, the first communication station 108 may blacklist (e.g., as an unauthorized or a rogue station in the mirroring list) the second communication station 110 on receipt of an invalid response from the second communication station 110.

At 336, the second communication station 110 may be configured to capture encrypted data packets of the data stream transmitted from the data streaming station 102 based on the shared temporal key. The first communication station 108 may be initially configured to receive the unicast data stream that may be encrypted, from the data streaming station 102, via the wireless access point 106, since the first communication station 108 may have the temporal key to decrypt the data stream. The data stream may be filtered and decrypted by using the temporal key.

At 338, the second communication station 110 may be configured to transmit a new mirroring request to the first communication station 108 in an event of expiry of the temporal key after the validity period is over.

At 340, the first communication station 108 may be configured to negotiate an access to a new temporal key with the wireless access point 106. The negotiation for the new temporal key may be a security measure established for the WLAN 112, in accordance with the key exchange protocol.

At 342, the first communication station 108 may be configured to share the new temporal key with a new valid time period to the second communication station 110.

At 344, the second communication station 110 may be configured to transmit a new acknowledgement signal to the first communication station 108 based on the shared temporal key.

At 346, the first communication station 108 may be configured to listen to new mirroring requests from different communication stations of the plurality of communication stations registered on the WLAN 112. The new communication stations may correspond to RFM stations that have same RF channel as that of the first communication station 108 (mirrored station). The first communication station 108 may be configured to authenticate mirroring requests from the new communication stations based on the key exchange protocol between the first communication station 108 and the different communication stations.

At 348, the first communication station 108 may be configured to update records of mirroring requests in a database stored in the memory 206. The records may be updated based on the new authenticated RFM stations in the WLAN 112.

At 350, the second communication station 110 may be configured to send a mirroring closure request to the first communication station 108.

At 352, the first communication station 108 may be configured to close the session based on the mirroring closure request from the second communication station 110. Once the second communication station 110 closes the session with the first communication station 108, a re-negotiation may take place between remaining stations and the first communication station 108 (mirrored station) to enable a secure connection between all the communication stations.

At 354, the first communication station 108 may be configured to re-associate with the wireless access point 106. In re-association, the new temporal key may be shared with the wireless access point 106 such that subsequent data packets may be encrypted with the new temporal key and data integrity of the WLAN 112 stays intact. The sequence of operations, as described from 302 to 354, may be repeated whenever a communication station in a communication system (e.g., the communication system 104) may act as a unicast node and other stations in the communication system 104 may act as RF monitoring nodes.

Figure 4A:
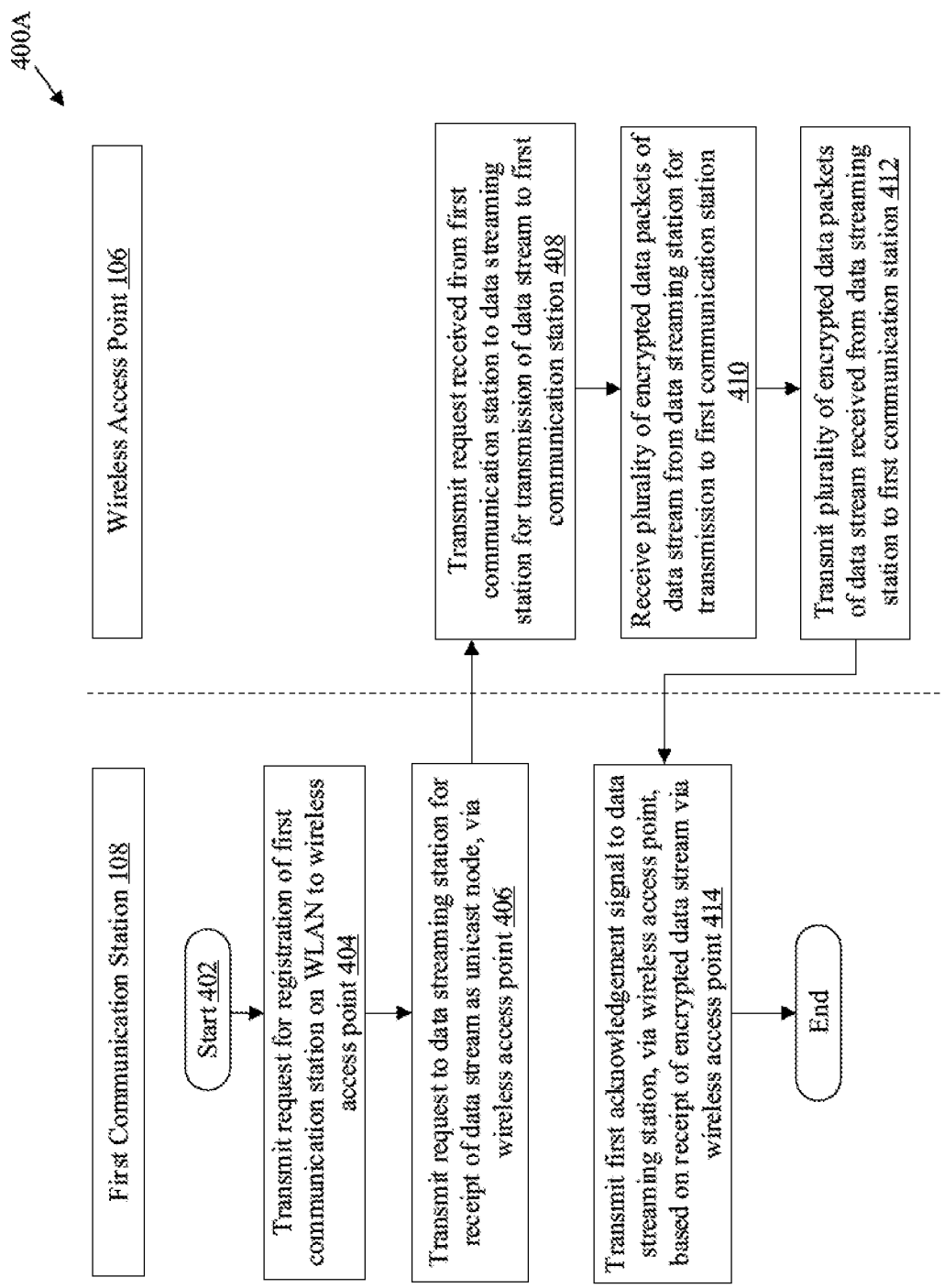
FIG. 4A illustrates a flowchart that depicts exemplary operations for registration of a unicast node on a secured wireless local area network, in accordance with an embodiment of the disclosure.

FIG. 4A illustrates a flowchart that depicts exemplary operations for registration of a unicast node on a secured wireless local area network, in accordance with an embodiment of the disclosure. FIG. 4A is explained in conjunction with elements from FIGS. 1A, 1B, 1D, 1E, 2, and 3A to 3C. With reference to FIG. 4A, there is shown a flowchart 400A. The method, in accordance with the flowchart 400A, may be implemented on the communication system 104. The method starts at 402 and proceeds to 404.

At 404, a request for registration of the first communication station 108 in the WLAN 112 may be transmitted to the wireless access point 106. The request may be associated with a requirement of the first communication station 108 to access a data stream from a streaming station, such as, the data streaming station 102. The first communication station 108 may be configured to transmit a request for registration of the first communication station 108 in the WLAN 112, to the wireless access point 106. The first communication station 108 may be configured to access the WLAN 112 with a preset security key after the registration of the first communication station 108 in the WLAN 112. The preset security key may be used for validation of different information (e.g., request information) communicated by the wireless access point 106 for authentication of the first communication station 108. The authentication may be used to check whether the first communication station 108 is a legitimate node in the communication system 104.

At 406, a request may be transmitted to the data streaming station 102 for a receipt of a data stream as a unicast node, via the wireless access point 106. The first communication station 108 may be configured to transmit a request to the data streaming station 102 for a receipt of a data stream as a unicast node, via the wireless access point 106.

At 408, the request received from the first communication station 108 may be transmitted to the data streaming station 102 for the transmission of the data stream to the first communication station 108. The wireless access point 106 may be configured to transmit the request received from the first communication station 108 to the data streaming station 102 for the transmission of the data stream to the first communication station 108.

At 410, a plurality of encrypted data packets of the data stream may be received from the data streaming station 102 for transmission to the first communication station 108. The wireless access point 106 may be configured to receive a plurality of encrypted data packets of the data stream from the data streaming station 102 for transmission to the first communication station 108. In accordance with an embodiment, the data stream may be transmitted over a single hop network, where the wireless access point 106 is the only node through which packets of the data stream hop to reach target devices (such as the first communication station 108). In accordance with another embodiment, the data stream may be transmitted over a multi-hop network, where a dedicated node is provided per multi-hop network. In such multi-hop network, the dedicated node may be configured to act as a local data streaming station. RFMON nodes (such as the second communication station 110) under an access point (AP) grab data from a channel used for communication between the AP and the unicast node (such as the first communication station 108). As far as key exchange is concerned, the multi-hop topology follows the protocol as specified for single-hop topology. Individual AP and the unicast node perform handshake and generate the encryption key which shall be shared with RFMON nodes.

At 412, the plurality of encrypted data packets of the data stream received from the data streaming station 102 may be transmitted to the first communication station 108. The wireless access point 106 may be configured to transmit the plurality of encrypted data packets of the data stream, received from the data streaming station 102, to the first communication station 108. The first communication station 108 may act as a unicast node that receives the data stream from the data streaming station 102, via the wireless access point 106. The encrypted data packets of the data stream may be decrypted at the first communication station 108.

At 414, a first acknowledgement signal may be transmitted to the data streaming station 102, via the wireless access point 106, based on receipt of the encrypted data stream via the wireless access point 106. The first communication station 108 may be configured to transmit a first acknowledgement signal to the data streaming station 102, via the wireless access point 106, based on receipt of the encrypted data stream via the wireless access point 106. Control passes to end.

Figure 4B:
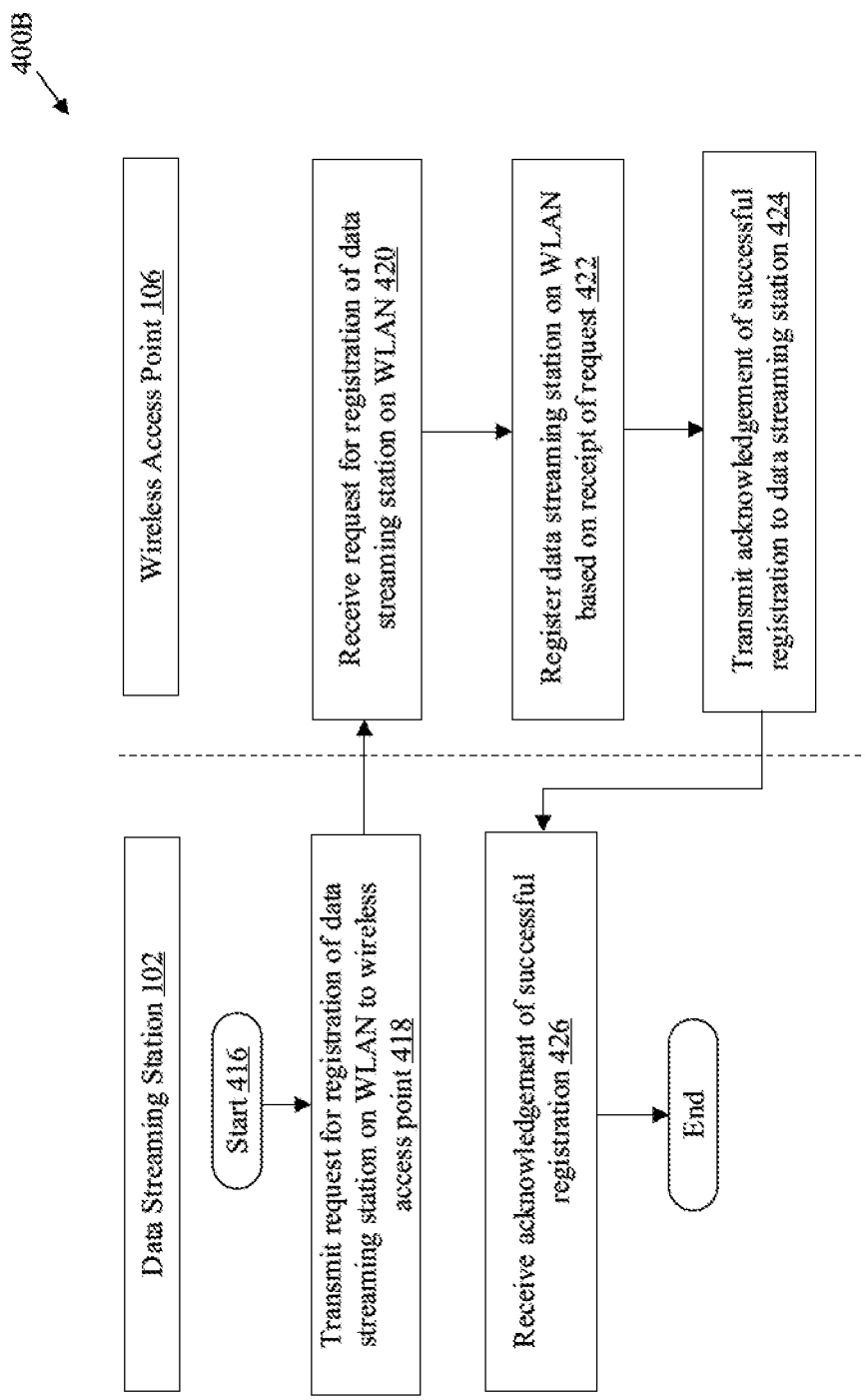
FIG. 4B illustrates a flowchart that depicts exemplary operations for registration of another unicast node on a secured wireless local area network, in accordance with an embodiment of the disclosure.

FIG. 4B illustrates a flowchart that depicts exemplary operations for registration of another unicast node on a secured wireless local area network, in accordance with an embodiment of the disclosure. FIG. 4B is explained in conjunction with elements from FIGS. 1A, 1B, 1D, 1E, 2, 3A to 3C, and 4A. With reference to FIG. 4B, there is shown a flowchart 400B. The method, in accordance with the flowchart 400B, may be implemented in the communication system 104. The method starts at 416 and proceeds to 418.

At 418, a request for registration of the data streaming station 102 on the WLAN 112 may be transmitted to the wireless access point 106. The data streaming station 102 may be configured to transmit the request for registration of the data streaming station 102 on the WLAN 112 to the wireless access point 106.

At 420, the request for the registration of the data streaming station 102 on the WLAN 112 may be received. The wireless access point 106 may be configured to receive the request for the registration of the data streaming station 102 on the WLAN 112.

At 422, the data streaming station 102 may be registered on the WLAN 112 based on the receipt of the request. The wireless access point 106 may be configured to register the data streaming station 102 on the WLAN 112 based on the receipt of the request.

At 424, an acknowledgement of successful registration may be transmitted to the data streaming station 102. The wireless access point 106 may be configured to transmit the acknowledgement of the successful registration of the data streaming station 102 on the WLAN 112.

At 426, the acknowledgement of the successful registration may be received. The data streaming station 102 may be configured to receive the acknowledgement of the successful registration. Control passes to end.

Figure 5A:
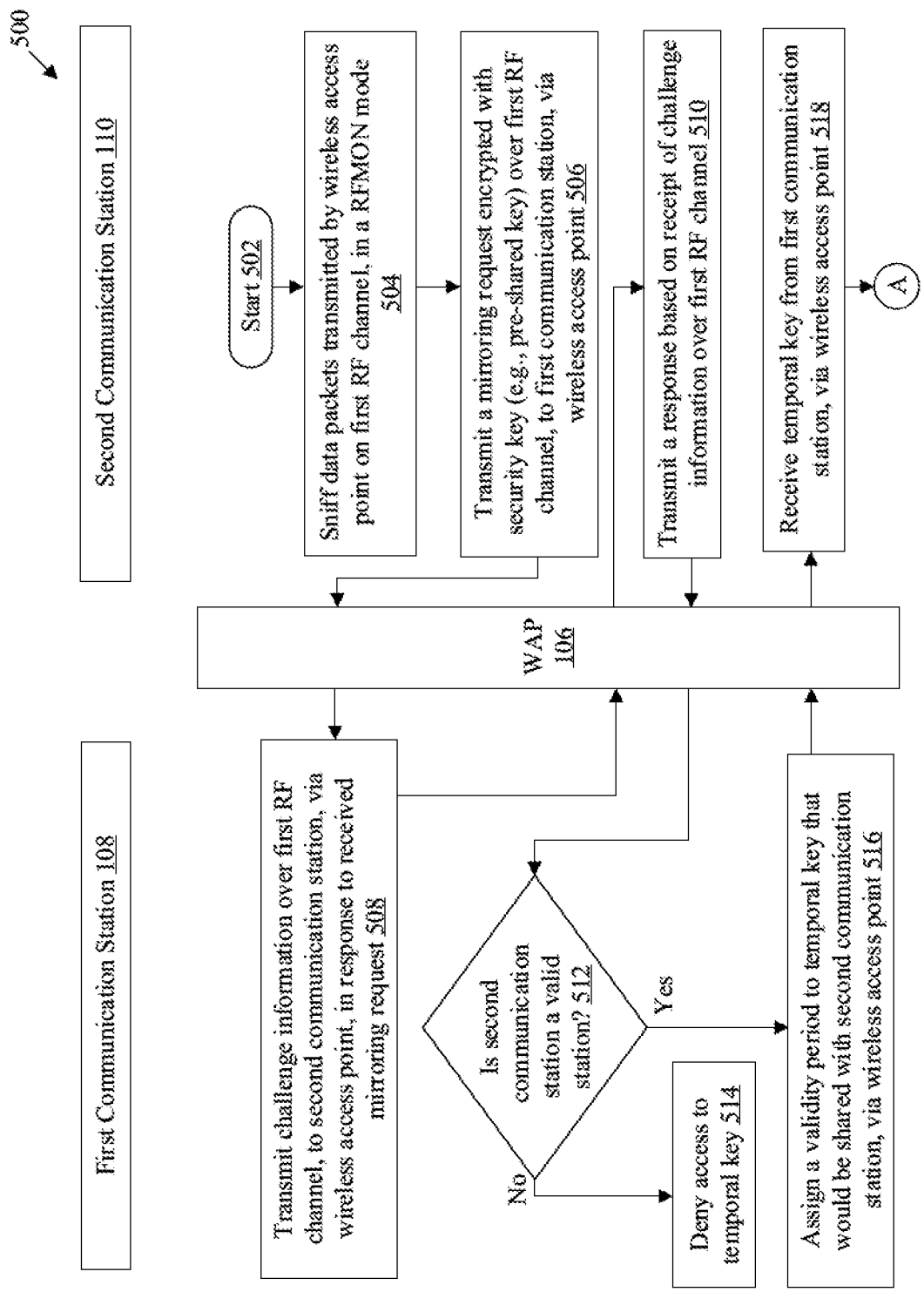
FIGS. 5A and 5B, collectively, illustrate a flowchart that depicts exemplary operations for a virtual broadcast of unicast data stream in a secured wireless local area network, in accordance with an embodiment of the disclosure.
Figure 5B:
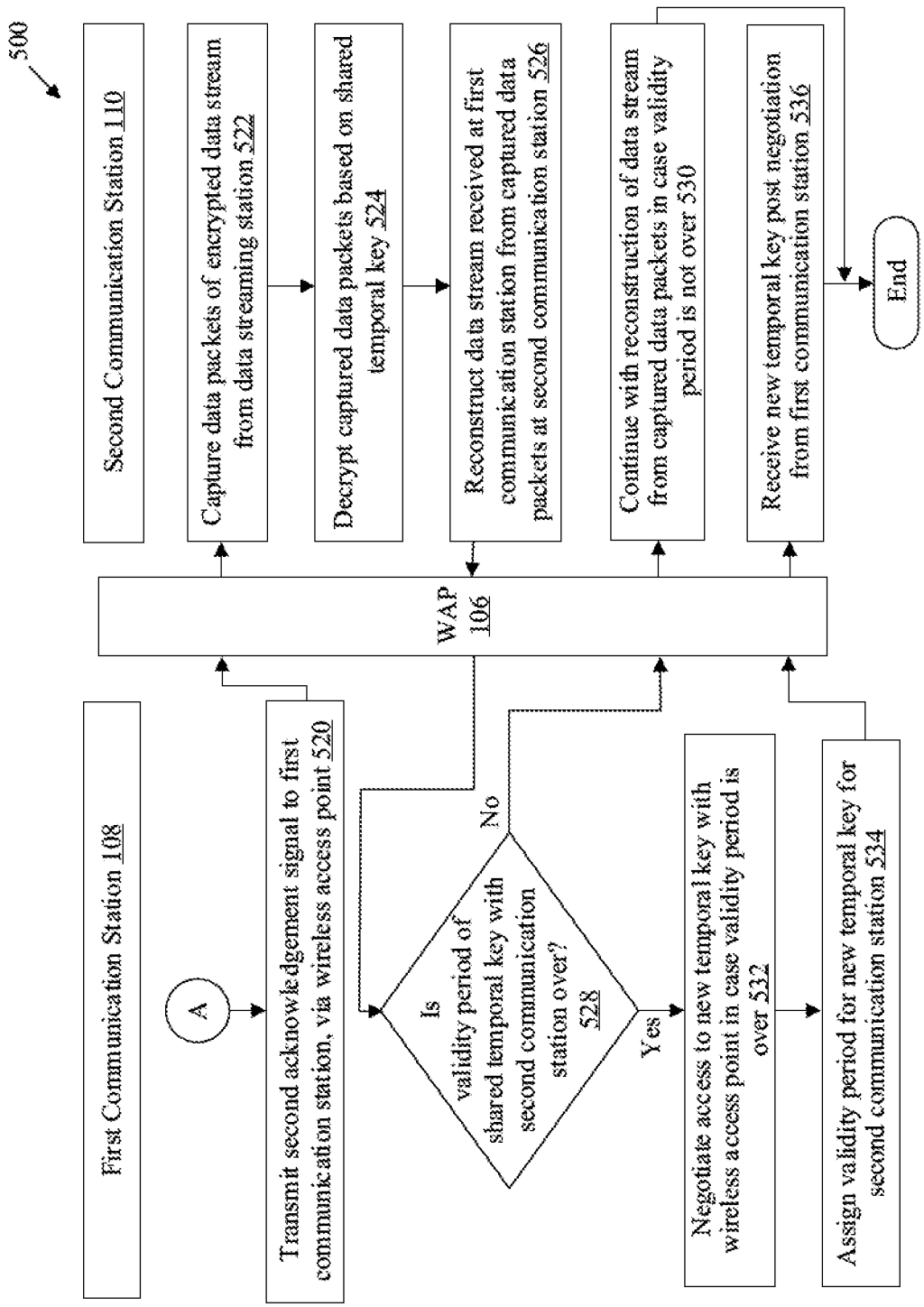

FIGS. 5A and 5B, collectively, illustrate a flowchart that depicts exemplary operations for a virtual broadcast of unicast data stream in a secured wireless local area network, in accordance with an embodiment of the disclosure. FIGS. 5A and 5B are explained in conjunction with elements from FIGS. 1A, 1B, 1D, 1E, 2, 3A to 3C, 4A, and 4B. With reference to FIGS. 5A and 5B, there is shown a flowchart 500. The method, in accordance with the flowchart 500, may be implemented on the communication system 104. The method starts at 502 and proceeds to 504.

At 504, data packets transmitted by the wireless access point 106 on the first RF channel, may be sniffed in a RFMON mode. The second communication station 110 may be configured to sniff the data packets transmitted by the wireless access point 106 on the first RF channel, in the RFMON mode. The second communication station 110 may be registered on the WLAN 112. The second communication station 110 may be configured to access the WLAN 112 with a preset security key.

At 506, a mirroring request encrypted with a security key (e.g., a pre-shared key) may be transmitted over the first RF channel, to the first communication station 108, via the wireless access point 106. The second communication station 110 may be configured to transmit a mirroring request encrypted with a security key (e.g., a pre-shared key) over the first RF channel, to the first communication station 108, via the wireless access point 106. The second communication station 110 may correspond to a mirroring station. The mirroring request transmitted by the second communication station 110 to the first communication station 108 may be a legitimate request that may be transmitted on a Wi-Fi packet encrypted by the security key.

At 508, challenge information may be transmitted over the first RF channel, to the second communication station 110, via the wireless access point 106, in response to the received mirroring request. The first communication station 108 may be configured to transmit the challenge information over the first RF channel, to the second communication station 110, via the wireless access point 106, in response to the received mirroring request. The challenge information may be transmitted to the second communication station 110 to ensure that a legitimate request may be received from an authorized station. The challenge information transmitted by the first communication station 108 to the second communication station 110 may be user-configurable (e.g., a user-configurable password).

At 510, a response may be transmitted based on a receipt of the challenge information over the first RF channel. The second communication station 110 may be configured to transmit a response based on a receipt of the challenge information over the first RF channel. As an example, if the challenge information requires a password for the Wi-Fi network, the response may include the password.

At 512, it may be determined whether the response received from the second communication station 110 is a valid response. The first communication station 108 may be configured to determine whether the response received from the second communication station 110 is a valid response. In a case where the response received from the second communication station 110 is a valid response, control passes to 516. Otherwise, control passes to 514.

At 514, access to a temporal key may be denied to the second communication station 110. The first communication station 108 may be configured to deny access to the temporal key to the second communication station 110 based on an invalid response from the second communication station 110. In accordance with an embodiment, the first communication station 108 may add the second communication station 110 as a blacklisted station in a mirroring list based on receipt of an invalid response from the second communication station 110.

At 516, a validity period may be assigned to a temporal key that would be shared with the second communication station 110, via the wireless access point 106. The first communication station 108 may be configured to assign a validity period to the temporal key at a time of sharing the temporal key with the second communication station 110. The assigned validity period may span a first time at the assignment of the validity period to a second time after which the temporal key may expire.

At 518, the temporal key may be received from the first communication station 108, via the wireless access point 106. The second communication station 110 may be configured to receive the temporal key from the first communication station 108. The temporal key may be received at the second communication station 110 with an updated validity period.

At 520, a second acknowledgement signal may be transmitted to the first communication station 108, via the wireless access point 106. The second communication station 110 may be configured to transmit the second acknowledgement signal to the first communication station 108, via the wireless access point 106, based on receipt of the temporal key. This may be considered as one part of the key exchange between the first communication station 108 and the second communication station 110.

At 522, the data packets of the encrypted data stream from the data streaming station 102 may be captured. The second communication station 110 may be configured to capture data packets of the encrypted data stream at a first data rate, via the wireless access point 106, based on radio frequency monitoring (RFM) of network traffic in the same first RF channel of the WLAN 112.

At 524, the captured data packets may be decrypted based on shared temporal key. The second communication station 110 may be configured to decrypt the captured data packets of the encrypted data stream, based on the shared temporal key. The encrypted data packets may be decrypted on the second communication station 110 such that a difference between the first data rate and the unicast data rate may be a minimum.

At 526, the data stream received at the first communication station 108 may be reconstructed from the captured data packets at the second communication station 110. The second communication station 110 may be further configured to reconstruct the data stream received at the first communication station 108 from the captured data packets at the second communication station 110. The data stream may correspond to the encrypted data stream unicasted to the first communication station 108. The data stream may be reconstructed in the secured WLAN 112 such that the second communication station 110 may only be configured to capture and decrypt the data packets in the first RF channel, based on the information of the temporal key with the second communication station 110.

At 528, it may be determined whether the validity period of the shared temporal key with the second communication station 110 is over. The first communication station 108 may be configured to determine whether the validity period of the shared temporal key on the second communication station 110 is over. In a case where the validity period of the shared temporal key is over, control passes to 532. Otherwise, control passes to 530.

At 530, the reconstruction of the data stream from the captured data packets may be continued in case the validity period is not over for the second communication station 110. The second communication station 110 may be configured to continue the reconstruction of the data stream from the captured data packets in case the validity period is not over. In accordance with an embodiment, the reconstruction of data stream based on validity period may not be applicable for the first communication station 108.

At 532, an access to a new temporal key may be negotiated with the second communication station 110 in case the validity period is over. The first communication station 108 may be configured to negotiate an access to the new temporal key in case the validity period is over.

At 534, a validity period for the new temporal key may be assigned for the second communication station 110. The first communication station 108 may be configured to assign the validity period to the new temporal key at a time of sharing the new temporal key.

At 536, new temporal key may be received post the negotiation from the first communication station 108. The second communication station 110 may be further configured to receive the new temporal key from the first communication station 108 post the negotiation. The new temporal key may be received at the second communication station 110 with an updated validity period. Control passes to end.

Figure 6A:
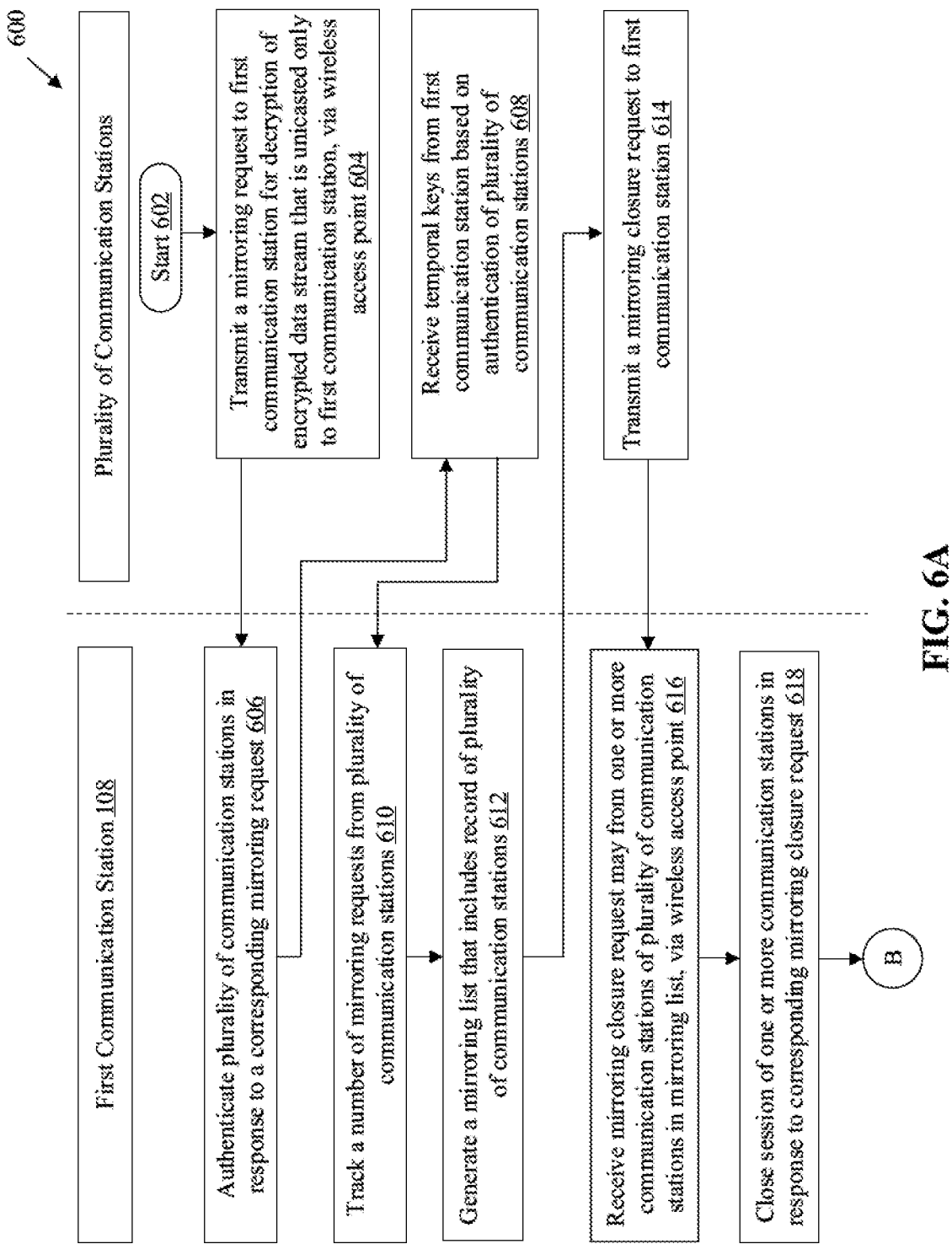
FIGS. 6A and 6B, collectively, illustrate a flowchart that depicts exemplary operations for a virtual broadcast of unicast data stream to a plurality of communication stations in a secured wireless local area network, in accordance with an embodiment of the disclosure.
Figure 6B:
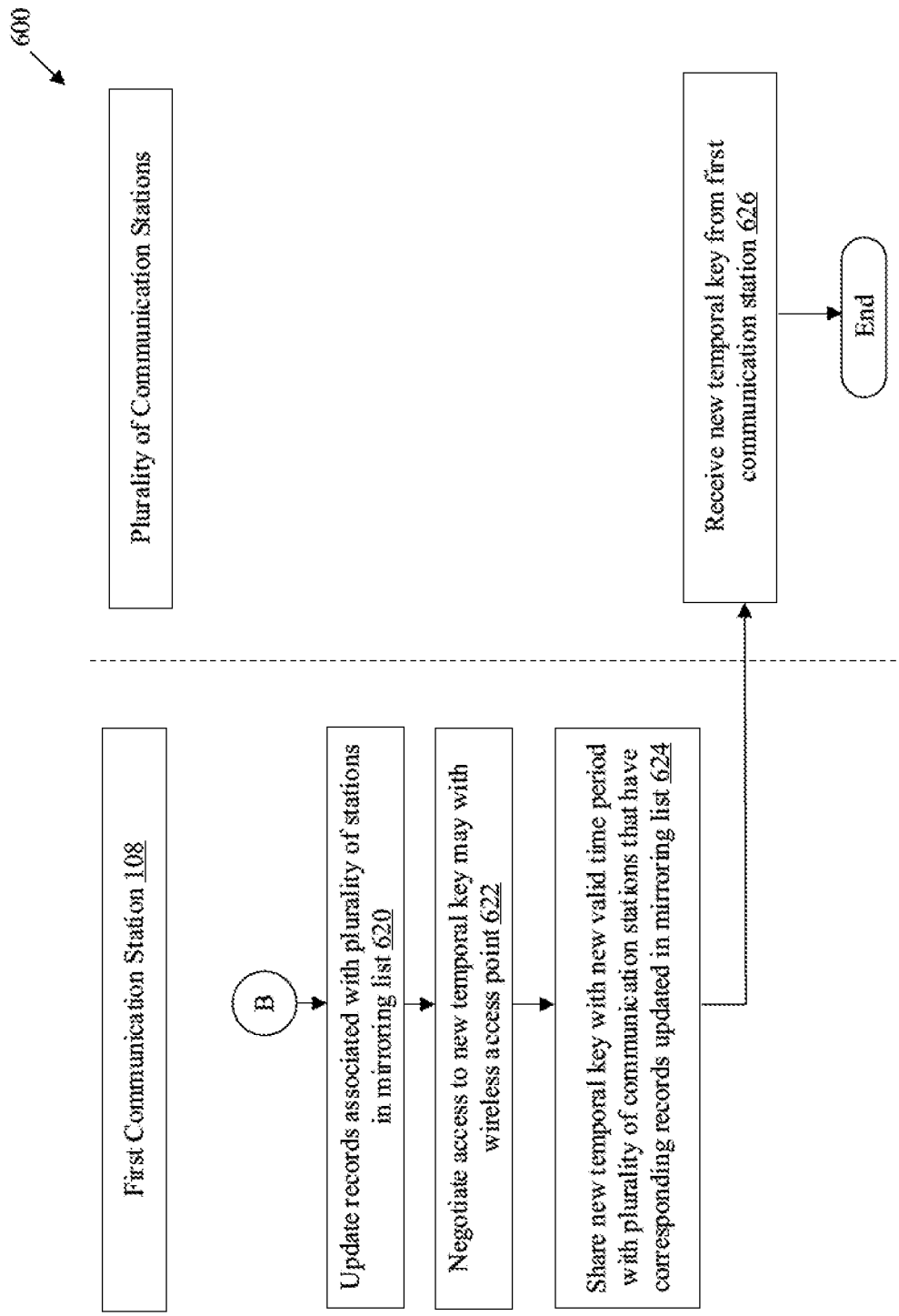

FIGS. 6A and 6B, collectively, illustrate a flowchart that depicts exemplary operations for a virtual broadcast of unicast data stream to a plurality of communication stations in a secured wireless local area network, in accordance with an embodiment of the disclosure. FIGS. 6A and 6B are explained in conjunction with elements from FIGS. 1A, 1B, 1D, 1E, 2, 3A to 3C, 4A, 4B, 5A, and 5B. With reference to FIGS. 6A and 6B, there is shown a flowchart 600. The method, in accordance with the flowchart 600, may be implemented on the communication system 104. The method starts at 602 and proceeds to 604.

At 604, a mirroring request to decrypt an encrypted data stream that is unicasted only to the first communication station 108, may be transmitted to the first communication station 108, via the wireless access point 106. A plurality of communication stations, such as the second communication station 110 and a third communication station, may be configured to transmit a mirroring request to the first communication station 108, via the wireless access point 106, based on a key exchange protocol. The mirroring request may be transmitted over a data packet, encrypted by the security key, to the first communication station 108.

At 606, a plurality of communication stations may be authenticated in response to a corresponding mirroring request. The first communication station 108 may be configured to authenticate the plurality of communication stations in response to a corresponding mirroring request. The plurality of stations may include at least the second communication station 110 and a third communication station.

At 608, temporal keys may be received from the first communication station 108 based on the authentication of the plurality of communication stations. The plurality of communication stations, such as the second communication station 110 and a third communication station, may be configured to receive the temporal keys from the first communication station 108 based on the authentication of the plurality of communication stations.

At 610, a number of mirroring requests from the plurality of communication stations may be tracked. The first communication station 108 may be configured to track a number of mirroring requests received from the plurality of communication stations, via the wireless access point 106. Each mirroring request from the number of mirroring requests may correspond to a request to decrypt, at a corresponding communication station from the plurality of communication stations, the encrypted data stream that is unicasted only to the first communication station 108 at the unicast data rate.

At 612, a mirroring list that may include a record of the plurality of communication stations may be generated. The first communication station 108 may be further configured to generate a mirroring list that may include a record of the plurality of communication stations. The mirroring list may further include metadata for the temporal key that may be shared between the first communication station 108 and the plurality of stations. The memory 206 may be configured to store the mirroring list.

At 614, a mirroring closure request may be transmitted to the first communication station 108. The plurality of communication stations, such as the second communication station 110, may be configured to transmit a mirroring closure request to the first communication station 108.

At 616, the mirroring closure request may be received from one or more communication stations of the plurality of communication stations in the mirroring list, via the wireless access point 106. The first communication station 108 may be configured to receive the mirroring closure request from one or more communication stations of the plurality of communication stations in the mirroring list, via the wireless access point 106.

At 618, session of the one or more communication stations may be closed in response to a corresponding mirroring closure request. The first communication station 108 may be configured to close the session of the one or more communication stations, in response to a corresponding mirroring closure request. Once the first communication station 108 closes the session with the first communication station 108, a re-negotiation (e.g., a new temporal key may be generated) may take place between remaining stations and the first communication station 108 (mirrored station) to enable secure connection between all the communication stations.

At 620, records associated with the plurality of stations may be updated in the mirroring list. The first communication station 108 may be configured to update the records associated with the plurality of stations in the mirroring list. The records may be updated based on the new authenticated RF monitoring stations in the WLAN 112.

At 622, an access to a new temporal key may be negotiated with the wireless access point 106. The first communication station 108 may be configured to negotiate an access to the new temporal key with the wireless access point 106.

At 624, the new temporal key with a new valid time period may be shared with the plurality of stations that have corresponding records updated in the mirroring list. The first communication station 108 may be configured to share the new temporal key with a new valid time period with the plurality of stations that have corresponding records updated in the mirroring list.

At 626, the new temporal key may be received from the first communication station 108. The plurality of communication stations, such as the second communication station 110, may be configured to receive the new temporal key from the first communication station 108, via the wireless access point 106. Control passes to an end.

Exemplary aspects of the disclosure may include a communication system (such as the communication system 104) that includes a data streaming station (such as the data streaming station 102), a wireless access point (such as the wireless access point 106), a first communication station (such as the first communication station 108) that comprises a first network circuitry, a second communication station (such as the second communication station 110) that comprises a second network circuitry. In accordance with an embodiment, the data streaming station, the wireless access point, the first communication station, and the second communication station may operate in a first radio frequency channel of a WLAN (such as the WLAN 112). The first network circuitry may be configured to receive a mirroring request from the second communication station, via the wireless access point. The mirroring request may correspond to a request to decrypt, at the second communication station, an encrypted data stream that may be unicasted only to the first communication station at a unicast data rate, via the wireless access point. The first network circuitry may be configured to authenticate the second communication station as a valid station based on a response received from the second communication station. The second communication station may be authenticated based on a validation of the response that may be encrypted by a security key preset on the first communication station and the second communication station. The first network circuitry may be configured to share a temporal key with the second communication station, via the wireless access point. Such sharing of the temporal key may be based on the authentication of the second communication station and the received mirroring request. The second network circuitry may be configured to capture data packets of the encrypted data stream at a first data rate, via the wireless access point, based on radio frequency monitoring of network traffic in the first RF channel of the WLAN. The second network circuitry may be configured to decrypt the captured data packets of the encrypted data stream, based on the shared temporal key. The encrypted data packets may be decrypted on the second communication station such that a difference between the first data rate and the unicast data rate is a minimum.

In accordance with an embodiment, the first communication station may correspond to a mirrored station, the second communication station may correspond to a mirroring station that mirrors the first communication station in the first radio frequency channel and in the WLAN. In accordance with an embodiment, the communication system may further comprise a data streaming station that may communicate with the first communication station, via the wireless access point. The data streaming station may be configured to transmit a plurality of encrypted data packets of the data stream to the first communication station, via the wireless access point. In accordance with an embodiment, a first type of encryption key on the plurality of encrypted data packets may be different from a second type of encryption key on the encrypted data stream transmitted via the wireless access point to the first communication station. In accordance with an embodiment, the first network circuitry may be further configured to transmit a first acknowledgement signal to the data streaming station, via the wireless access point. The transmission of the first acknowledgement signal may be based on receipt of the encrypted data stream via the wireless access point.

In accordance with an embodiment, the second network circuitry may be further configured to transmit a mirroring request to the first communication station, via the wireless access point. Such transmission of the mirroring request may be based on a key exchange protocol between the first communication station and the second communication station. The mirroring request may be transmitted over a data packet, encrypted by the security key, to the first communication station.

In accordance with an embodiment, the second network circuitry may be further configured to transmit the mirroring request to the data streaming station, via the wireless access point, based on a key exchange protocol between the data streaming station and the second communication station. The mirroring request may be transmitted over a data packet, encrypted by the security key, to the data streaming station.

In accordance with an embodiment, the first network circuitry may be further configured to transmit challenge information to the second communication station based on the received mirroring request from the second communication station. The challenge information may be transmitted in order to verify whether the second communication station is the valid station that is connected on the WLAN and configured with the security key. The challenge information may comprise a specific task information based on which the second communication station is requested to transmit the response.

In accordance with an embodiment, the second network circuitry may be further configured to transmit the response to the first communication station based on the challenge information received from the first communication station.

In accordance with an embodiment, the first network circuitry may be further configured to validate the response based on validation criteria specified in a key exchange protocol. The validation criteria may comprise a match of the response with an expected response stored on the first communication station, a decryption of the response based on the security key on the first communication station, a connection of the first communication station, the second communication station, and the wireless access point on the WLAN. The response may be validated in order to share the temporal key with the second communication station.

In accordance with an embodiment, the first network circuitry may be further configured to deny the second communication station to access the temporal key based on an invalidation of response. In accordance with an embodiment, the validation of the response may correspond to the authentication of the second communication station. The temporal key may be shared with the second communication station, via the wireless access point, based on the validation of the response.

In accordance with an embodiment, the first network circuitry may be configured to assign a validity period to the temporal key at a time of sharing the temporal key with the second communication station. The assigned validity period may span a first time at the assignment of the validity period to a second time after which the temporal key expires. In accordance with an embodiment, the first network circuitry may be further configured to negotiate an access to a new temporal key with the first communication station based on an expiry of the assigned validity period of the shared temporal key.

In accordance with an embodiment, the second network circuitry may be further configured to receive the new temporal key from the first communication station post the negotiation. The new temporal key may be received with an updated validity period. In accordance with an embodiment, the first network circuitry may be further configured to receive a second acknowledgement signal from the second communication station, based on receipt of the temporal key from the first communication station.

In accordance with an embodiment, the communication system may further comprise a plurality of communication stations that may be authenticated by the first communication station, based on a corresponding mirroring request to the first communication station. The plurality of stations may comprise at least the second communication station and a third communication station.

In accordance with an embodiment, the first network circuitry may be further configured to track a number of mirroring requests received from the plurality of communication stations, via the wireless access point. Each mirroring request may correspond to a request to decrypt, at a corresponding communication station from the plurality of communication stations, the encrypted data stream that is unicasted only to the first communication station at the unicast data rate.

In accordance with an embodiment, the wireless access point, the first communication station, and the plurality of communication stations may be configured to operate in accordance with a multi-hop data streaming topology. The data stream may be transmitted over a multi-hop network, where a dedicated node is provided per multi-hop network. In such multi-hop network, the dedicated node may be configured to act as a local data streaming station. RFMON nodes (such as the second communication station 110) under an access point (AP) grab data from a channel used for communication between the AP and the unicast node (such as the first communication station 108). As far as key exchange is concerned, the multi-hop topology follows the protocol as specified for single-hop topology. Individual AP and the unicast node perform handshake and generate the encryption key which shall be shared with RFMON nodes.

In accordance with an embodiment, the first network circuitry may be further configured to generate a mirroring list that may comprise a record of the plurality of communication stations. The mirroring list may further comprise metadata for the temporal key that may be shared between the first communication station and the plurality of stations. The first network circuitry may be configured to update the mirroring list in accordance with a track of the plurality of communication stations, wherein the mirroring list is updated based on a modification in an access state of one or more stations from the plurality of communication stations.

In accordance with an embodiment, the first network circuitry may be further configured to generate the temporal key based on a handshake-communication between the first communication station and the wireless access point. In accordance with an embodiment, the first network circuitry may be configured to share the temporal key with each station of the plurality of communication stations in the mirroring list.

In accordance with an embodiment, the first network circuitry may be further configured to receive to a mirroring closure request from one or more communication stations of the plurality of communication stations in the mirroring list, via the wireless access point. In accordance with an embodiment, the first network circuitry may be further configured to close a session between the first communication station and the one or more stations, based on the received mirroring closure request from the one or more stations. In accordance with an embodiment, the first network circuitry may be further configured to negotiate, with the wireless access point, for generation of a new temporal key based on closure of the session between the first communication station and the one or more communication stations. The generation for the new temporal key may be negotiated to regulate a secure access of the encrypted media stream by only a set of communication stations that are updated in the mirroring list. The set of communication stations may be RF monitoring stations that may be updated in the mirroring list after the session of the one or more stations is closed. In accordance with an embodiment, the first network circuitry may be further configured to generate the new temporal key based on the negotiation between the wireless access point and the first communication station. In accordance with an embodiment, the first network circuitry may be further configured to share the new temporal key with the set of communication stations in the mirroring list.

In accordance with an embodiment, the second network circuitry may be further configured to reconstruct a data stream, which corresponds to the encrypted data stream unicasted to the first communication station, based on the decrypted data packets captured in the first RF channel. The data stream may be reconstructed in a secured WLAN such that a communication station that has the temporal key is only configured to capture and decrypt the data packets in the first RF channel. In accordance with an embodiment, the data streaming station may be configured to apply a dynamic forward error correction (FEC) on the encrypted data stream to maximize a probability of reconstruction of the data stream from the decrypted data packets.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system that has an information processing capability to perform a particular function either directly, or after either or both of the following: a) conversion to another language, code or notation; b) reproduction in a different material form.

While the present disclosure has been described with reference to certain embodiments, it will be understood by those skilled in the art that various changes may be made and equivalents may be substituted without departure from the scope of the present disclosure. In addition, many modifications may be made to adapt a particular situation or material to the teachings of the present disclosure without departure from its scope. Therefore, it is intended that the present disclosure not be limited to the particular embodiment disclosed, but that the present disclosure will include all embodiments that falls within the scope of the appended claims.

What is claimed is:

1. A communication system, comprising:
a wireless access point;
a data streaming station;
a first communication station that comprises a first network circuitry; and
a second communication station that comprises a second network circuitry, wherein the wireless access point, the data streaming station, the first communication station, and the second communication station operate in a first radio frequency (RF) channel of a wireless local area network (WLAN),
the first network circuitry is configured to:
receive a mirroring request from the second communication station, via the wireless access point, wherein the mirroring request corresponds to a request to decrypt, at the second communication station, an encrypted data stream that is unicasted only to the first communication station at a unicast data rate, via the wireless access point;
authenticate the second communication station as a valid station based on a response received from the second communication station, wherein the second communication station is authenticated based on a validation of the response that is encrypted by a security key preset on the first communication station and the second communication station; and
share a temporal key with the second communication station, via the wireless access point, based on the authentication of the second communication station and the received mirroring request, and
the second network circuitry is configured to:
capture data packets of the encrypted data stream at a first data rate, via the wireless access point, based on radio frequency monitoring of network traffic in the first RF channel of the WLAN; and
decrypt the captured data packets of the encrypted data stream, based on the shared temporal key.

2. The communication system according to claim 1, wherein the first communication station corresponds to a mirrored station, and the second communication station corresponds to a mirroring station that mirrors the first communication station in the first RF channel and in the WLAN.

3. The communication system according to claim 1, wherein the data streaming station communicates to the first communication station, via the wireless access point, and the data streaming station is configured to transmit a plurality of encrypted data packets of the data stream to the first communication station, via the wireless access point.

4. The communication system according to claim 3, wherein a first type of encryption key for the plurality of encrypted data packets is different from a second type of encryption key for the encrypted data stream transmitted via the wireless access point to the first communication station.

5. The communication system according to claim 3, wherein the first network circuitry is further configured to transmit a first acknowledgement signal to the data streaming station, via the wireless access point, based on receipt of the encrypted data stream via the wireless access point.

6. The communication system according to claim 1, wherein the second network circuitry is further configured to transmit the mirroring request to the first communication station, via the wireless access point, based on a key exchange protocol between the first communication station and the second communication station, and the mirroring request is transmitted over a data packet, encrypted by the security key, to the first communication station.

7. The communication system according to claim 6, wherein the first network circuitry is further configured to transmit challenge information to the second communication station based on the received mirroring request from the second communication station, the challenge information is transmitted in order to verify whether the second communication station is the valid station that is connected on the WLAN and configured with the security key, and the challenge information comprises a specific task information based on which the second communication station is requested to transmit the response.

8. The communication system according to claim 7, wherein the second network circuitry is further configured to transmit the response to the first communication station based on the challenge information received from the first communication station.

9. The communication system according to claim 8, wherein the first network circuitry is further configured to validate the response based on validation criteria specified in a key exchange protocol, the validation criteria comprises a match of the response with an expected response stored on the first communication station, a decryption of the response based on the security key on the first communication station, a connection of the first communication station, the second communication station, and the wireless access point on the WLAN, and the response is validated in order to share the temporal key with the second communication station.

10. The communication system according to claim 8, wherein the first network circuitry is further configured to deny the second communication station to access the temporal key based on an invalidation of the response.

11. The communication system according to claim 1, wherein the second network circuitry is further configured to transmit the mirroring request to the data streaming station, via the wireless access point, based on a key exchange protocol between the data streaming station and the second communication station, and the mirroring request is transmitted over a data packet, encrypted by the security key, to the data streaming station.

12. The communication system according to claim 1, wherein the validation of the response corresponds to the authentication of the second communication station, and the temporal key is shared with the second communication station, via the wireless access point, based on the validation of the response.

13. The communication system according to claim 1, wherein the first network circuitry is configured to assign a validity period to the temporal key at a time of sharing the temporal key with the second communication station, and the assigned validity period spans a first time at the assignment of the validity period to a second time after which the temporal key expires.

14. The communication system according to claim 13, wherein the first network circuitry is further configured to negotiate an access to a new temporal key with the first communication station based on an expiry of the shared temporal key after the assigned validity period is over.

15. The communication system according to claim 14, wherein the second network circuitry is further configured to receive the new temporal key from the first communication station post the negotiation, and the new temporal key is received with an updated validity period.

16. The communication system according to claim 1, wherein the first network circuitry is further configured to receive a second acknowledgement signal from the second communication station, based on receipt of the temporal key from the first communication station.

17. The communication system according to claim 1, further comprising a plurality of communication stations that are authenticated by the first communication station, based on a corresponding mirroring request to the first communication station, wherein the plurality of communication stations comprises at least the second communication station and a third communication station.

18. The communication system according to claim 17, wherein the first network circuitry is further configured to track a number of mirroring requests received from the plurality of communication stations, via the wireless access point, and each mirroring request corresponds to a request to decrypt, at a corresponding communication station from the plurality of communication stations, the encrypted data stream that is unicasted only to the first communication station at the unicast data rate.

19. The communication system according to claim 17, wherein the first network circuitry is further configured to:
generate a mirroring list that comprises a record of the plurality of communication stations, wherein the mirroring list further comprises metadata for the temporal key that is shared between the first communication station and the plurality of communication stations; and
update the mirroring list in accordance with a track of the plurality of communication stations, wherein the mirroring list is updated based on a modification in an access state of one or more stations from the plurality of communication stations.

20. The communication system according to claim 19, wherein the first network circuitry is further configured to:
generate the temporal key based on a handshake-communication between the first communication station and the wireless access point; and
share the temporal key with each station of the plurality of communication stations in the mirroring list.

21. The communication system according to claim 19, wherein the first network circuitry is further configured to:
receive to a mirroring closure request from one or more communication stations of the plurality of communication stations in the mirroring list, via the wireless access point;
close a session between the first communication station and the one or more stations, based on the received mirroring closure request from the one or more stations;
negotiate, with the wireless access point, for generation of a new temporal key based on closure of the session between the first communication station and the one or more communication stations, wherein the generation for the new temporal key is negotiated to regulate a secure access of an encrypted media stream by only a set of communication stations that are updated in the mirroring list, and the set of communication stations are RF monitoring stations that are updated in the mirroring list after the session of the one or more stations is closed;
generate the new temporal key based on the negotiation between the wireless access point and the first communication station; and
share the new temporal key with the set of communication stations in the mirroring list.

22. The communication system according to claim 1, wherein the second network circuitry is further configured to reconstruct a data stream, which corresponds to the encrypted data stream unicasted to the first communication station, based on the decrypted data packets captured in the first RF channel, and the data stream is reconstructed in a secured WLAN such that the second communication station that has the temporal key is only configured to capture and decrypt the data packets in the first RF channel.

23. The communication system according to claim 22, wherein the data streaming station is configured to apply a dynamic forward error correction (FEC) on the encrypted data stream to maximize a probability of the reconstruction of the data stream from the decrypted data packets.

24. The communication system according to claim 1, wherein encrypted data packets are decrypted on the second communication station such that a difference between the first data rate and the unicast data rate is a minimum.

25. A method, comprising:
in a communication system that comprises a data streaming station, a wireless access point, a first communication station, and a second communication station, wherein the data streaming station, the wireless access point, the first communication station, and the second communication station operate in a first radio frequency (RF) channel of a wireless local area network (WLAN):
receiving, by first networking circuitry in the first communication station, a mirroring request from the second communication station, via the wireless access point, wherein the mirroring request corresponds to a request to decrypt, at the second communication station, an encrypted data stream that is unicasted only to the first communication station at a unicast data rate, via the wireless access point;
authenticating, by the first networking circuitry, the second communication station as a valid station based on a response received from the second communication station, wherein the second communication station is authenticated based on a validation of the response that is encrypted by a security key on the first communication station and the second communication station;
sharing, by the first networking circuitry, a temporal key with the second communication station, via the wireless access point, in response to the authentication of the second communication station and the received mirroring request;
capturing, by second networking circuitry in the second communication station, data packets of the encrypted data stream at a first data rate, via the wireless access point, based on RF monitoring of network traffic in the first RF channel of the WLAN; and
decrypting, by the second networking circuitry, the captured data packets of the encrypted data stream, based on the shared temporal key.

* * * * *